United States Patent [19]

Curliss et al.

[11] Patent Number: 4,983,346
[45] Date of Patent: Jan. 8, 1991

[54] METHOD FOR MOLDING A ONE-PIECE MOLDEDEND CLOSURE

[75] Inventors: Danny R. Curliss; Dwight E. Looney, both of Berea, Ky.

[73] Assignee: Mt. Vernon Plastics Corporation, Mt. Vernon, Ky.

[21] Appl. No.: 345,950

[22] Filed: May 1, 1989

Related U.S. Application Data

[60] Division of Ser. No. 62,784, Jun. 15, 1987, Pat. No. 4,830,214, which is a continuation-in-part of Ser. No. 792,705, Nov. 12, 1985, abandoned, which is a continuation-in-part of Ser. No. 863,238, May 14, 1986, abandoned, which is a division of Ser. No. 796,705, Nov. 12, 1985, abandoned.

[51] Int. Cl.$^5$ .............................................. B29C 45/44
[52] U.S. Cl. ..................... 264/328.1; 249/63; 264/318; 264/334; 425/428; 425/DIG. 58; 425/556
[58] Field of Search ............... 264/318, 328.1, 328.11, 264/334, 335, 336; 425/DIG. 58, 441, 438, 556; 249/63, 64, 148, 149

[56] References Cited

U.S. PATENT DOCUMENTS

| | | | |
|---|---|---|---|
| 3,402,713 | 9/1968 | Senkowski et al. | 264/318 |
| 4,019,711 | 4/1977 | Altenhof et al. | 425/DIG. 58 |
| 4,210,620 | 7/1980 | von Holdt | 264/318 |
| 4,709,757 | 12/1987 | Bly | 264/334 |

FOREIGN PATENT DOCUMENTS

| | | | |
|---|---|---|---|
| 2646604 | 4/1978 | Fed. Rep. of Germany | 220/276 |
| 2022063 | 12/1979 | United Kingdom | 264/318 |

*Primary Examiner*—Jill L. Heitbrink
*Attorney, Agent, or Firm*—Frank C. Leach, Jr.

[57] ABSTRACT

A one-piece molded end closure has a pull ring spaced from a main panel having an annular flange extending therefrom. When the end closure is frangible through having score lines formed in the main panel, the pull ring is connected by a tenon adjacent a score point, which is the junction of two score lines and inside of the inner diameter of the pull ring, so that pulling on the pull ring, which is substantially parallel to the main panel, starts rupturing of the two score lines. The end closure also may be a plug type having a friction fit within a container whereby there are no score lines; the pull ring is still used to remove the end closure from the open end of the container. The method and apparatus for molding enable production of the end closure as one piece without any tearing of the pull ring or rupturing of the score lines when the end closure is removed from the molding apparatus. The main panel may be formed with a single continuous score line and the pull ring not at the center of the main panel. The end closure also may be formed integral with a cylindrical side wall of the container rather than having the end closure molded separately and then being sealed to an open end of a container.

15 Claims, 13 Drawing Sheets

METHOD FOR MOLDING A ONE-PIECE MOLDED END CLOSURE

This is a division of application Ser. No. 062,784, filed Jun. 15, 1987 now U.S. Pat. No. 4,830,214. Application Ser. No. 062,784 is a continuation in part of U.S. application Ser. No. 796,705, filed Nov. 12, 1985, now abandoned and of U.S. application Ser. No. 863,238, filed May 14, 1986 now abandoned, a division of U.S. application Ser. No. 796,705 now abandoned.

This invention relates to a one-piece molded end closure and, more particularly, to a one-piece molded end closure having a pull ring specifically located relative to score lines in a main panel of the end closure when the end closure has score lines, a one-piece molded end closure integral with a wall of a container, and a method and apparatus for molding the end closure and the end closure integral with a wall of a container with the end closure having the pull ring in spaced relation to the main panel of the end closure.

An end closure is used to close an open end of a container such as a can, for example. The end closure seals the open end of the can and is opened by rupturing score lines in the end closure. Instead of having score lines, the end closure may have a friction fit within the open end of the can to close the can and be used again by insertion into the open end. With either of these end closures, it is desired to be able to grip a portion of the end closure to cause either easy rupturing of the score lines without injury to the user or removal of the end closure from the open end of the container without damage to the end closure when it is to be used again if it does not have the score lines.

One previously suggested end closure is disclosed in U.S. Pat. No. 3,981,412 to Asmus wherein FIG. 8 shows a tab fused to be integral with a top or main panel to enable rupturing of score lines in the top. This requires molding of the tab separately from the remainder of the end closure and then fusing the tab to the top. This is a relatively expensive end closure. It is not a one-piece end closure but comprises two separate molded pieces that are fused together.

Each of U.S. Pat. No. 3,407,957 to Robinson and U.S. Pat. No. 3,415,404 to Robinson relates to an end closure having a finger grip in spaced relation to its main panel or top. Each of the aforesaid Robinson patents depends upon rupturing of a frangible portion connecting the finger grip to the main panel of the end closure before any score lines are ruptured.

While the end closure of each of the aforesaid Robinson patents appears to be a one-piece end closure, molding of the finger grip in spaced relation to the main panel is deemed difficult if possible. This is because of the requirement for a steel core to be placed between the finger grip and the main panel during molding to keep them separated and then having to withdraw the finger grip from the steel core without causing damage to the finger grip or fracturing of the frangible portion connecting the finger grip to the main panel.

The aforesaid Robinson U.S. Pat. No. 3,415,404, has a pull ring as its finger grip in the embodiment of FIGS. 5-7. This requires the pull ring to be integral with an annular surrounding portion or rim of the end closure and to have the score means in a flange fitting over the top of the can. This has the difficulty of the sealing compound entering the score means when sealing to the can so that rupturing of the score means could be difficult.

Another end closure having a tear tab in spaced relation to its main panel so that it may be gripped for rupturing score lines in the main panel is found in U.S. Pat. No. 3,281,007 to Dorosz. Since the vertex or junction of the score lines is at the connection of the tear tab to the main panel, the removal of the tear tab from the steel core, which has to be disposed between the main panel and the tear tab to separate them during molding, can easily result in rupturing along the score lines because of the forces applied to the tear tab in removing it from the steel core.

A further end closure having a pull ring in spaced relation to its main panel so that it may be gripped for rupturing score lines in a main panel is disclosed in German patent application No. 26 46 604, published Apr. 20, 1978. This end closure requires double score lines so that a portion of the main panel to which the pull ring is initially attached can be completely severed therefrom whereby the possibility exists that this portion of the panel could be severed and fall into a container upon rupturing of the score lines. The pull ring is in the center of the main panel so as to not obtain the desired leverage produced when the pull ring is not at the center of the main panel.

FIGS. 11-13 of U.S. Pat. No. 4,380,303 to Allen et al show a one-piece end closure formed integral with a container. FIGS. 14-16 of the aforesaid Allen et al patent show a molding apparatus for forming this specific one-piece end closure, which is integral with the container. The structure of the molding apparatus of the aforesaid Allen et al patent prevents the pull ring of the aforesaid Allen et al patent from being attached to the main panel so that it must be attached to the annular surrounding portion of the end closure; it also requires double score lines to function.

The one-piece end closure of the present invention satisfactorily overcomes the problems of the previously suggested end closures. The end closure of the present invention is formed with a pull ring in spaced relation to the main panel and uses a unique molding method and apparatus to mold the end closure without a steel core between the pull ring and the main panel. Thus, the problems of the relatively large forces applied to the finger gripping means to cause rupturing along the score lines when the finger gripping means is removed from the molding apparatus of the previously suggested end closures is avoided.

This is accomplished through forming the pull ring of a relatively thin cross section, particularly with respect to the inner diameter of the pull ring, so that it has sufficient flexibility to be removed from the steel core without being subjected to sufficient force to cause rupturing of any score line in the main panel of the end closure to which the pull ring is connected. Therefore, by the pull ring being relatively thin, it can collapse as it is removed from the steel core of the molding apparatus of the present invention.

Additionally, by providing a pull ring with a relatively large inner diameter in comparison with its thickness, a removable mold element can be utilized adjacent the main panel and cooperate with the steel core to form the pull ring. This avoids subjecting the pull ring to relatively large forces when it is removed from the molding apparatus since the removable mold element is removed before the pull ring is withdrawn from the steel core.

Furthermore, the score lines are formed in the main panel of the end closure of the present invention. In the embodiment having the score point, which is the junction of two score lines with one of these score lines initially extending from a peripheral score line, the score point is positioned beneath the pull ring within the inner diameter of the pull ring. This makes it easier for the score lines to rupture.

The ability to mold the one-piece end closure with the pull ring in spaced relation to the main panel permits the end closure to be formed integral with the wall of the container. This results in a portion of the wall of the container forming the annular surrounding portion extending from the same side of the main panel as the pull ring. This integral end closure and container requires a different molding apparatus than the molding apparatus used in forming the one-piece end closure by itself. However, the molding apparatus includes a similar arrangement as to the portion forming the pull ring in spaced relation to the main panel.

The ability to mold a one-piece end closure with the pull ring in spaced relation to the main panel also allows the end closure to be utilized as a plug for closing an open end of a container such as a can, for example, in which the closure may be removed from the open end of the can by pulling on the pull ring and then reinserted into the open end of the can when it is desired to again close the open end of the can. This end closure can be molded with substantially the same molding apparatus as used for forming the one-piece molded end closure with the score lines. The molding apparatus would have to be slightly changed to not form the score lines in the main panel of the end closure.

When used to plug the open end of the can, the can normally has a frangible closure, which can be foil or foil paper laminate, for example, inside of the end closure. Thus, the initial opening of the can having the end closure as a plug requires not only removal of the end closure but fracturing of the frangible closure. Thereafter, the end closure is relied upon to close the open end of the can through the end closure having a friction fit with the inner wall of the can.

A object of this invention is to provide a method for molding a one-piece end closure having finger gripping means spaced from its main panel irrespective of whether the end closure has score lines or has a friction fit within an open end of a container.

Another object of this invention is to provide a method for molding a one-piece end closure integral with a wall of a container.

Other objects of this invention will be readily perceived from the following description, claims, and drawings.

This invention relates to a method of molding a one-piece end closure for closing an open end of a container in which the end closure includes a main panel having an annular surrounding portion at its periphery, a pull ring disposed in spaced and substantially parallel relation to the main panel, and means connecting the pull ring to the main panel. The method includes injecting molten plastic into a mold shaped to form the end closure and including first mold means having molding surface means, second mold means having first and second molding surface means, and third mold means having first and second molding surface means, the second mold means having passage means to receive a portion of the third mold means, the passage means in the second mold means having the second molding surface means of the second mold means and the portion of the third mold means having the second molding surface means of the third mold means cooperating with the second molding surface means of the second mold means to form the pull ring when the portion of the third mold means is disposed within the passage means in the second mold means so that the first molding surface means of the third mold means is in the same plane as at least the portion of the first molding surface means of the second mold means surrounding the first molding surface means of the third mold means. The portion of the third mold means is disposed within the passage means in the second mold means so that the first molding surface means of the third mold means is in the same plane as at least the portion of the first molding surface means of the second mold means surrounding the first molding surface means of the third mold means prior to injecting the molten plastic to form the end closure. The molten plastic is injected between the molding surface means of the first mold means and the first molding surface means of each of the second mold means and the third mold means to form the main panel and the annular surrounding portion of the formed end closure. The molten plastic is supplied from between the molding surface means of the first mold means and the first molding surface means of each of the second mold means and the third mold means to between the second molding surface means of each of the second mold means and the third mold means through communicating means in the second mold means with the connecting means being formed by the molten plastic in the communicating means. Relative movement is produced between the third mold means and the second mold means to withdraw a portion of the third mold means from the passage means in the second mold means prior to producing relative movement between the first mold means and the second and third mold means without shearing of any molded material so that the pull ring is free to collapse prior to relative movement between the first mold means and the second and third mold means to enable the pull ring to pass through the passage means in the second mold means when the formed end closure is disengaged from the first molding surface means of the second mold means. Relative movement is produced between the first mold means and the second and third mold means substantially parallel to the direction of relative movement between the third mold means and the second mold means to disengage the formed end closure from one of the molding surface means of the first mold means and the first molding surface means of the second mold means without any shearing of the molded material. The formed end closure is then disengaged from the other of the molding surface means of the first mold means and the first molding surface means of the second mold means.

The attached drawings illustrate preferred embodiments of the invention, in which.

Figure 1:
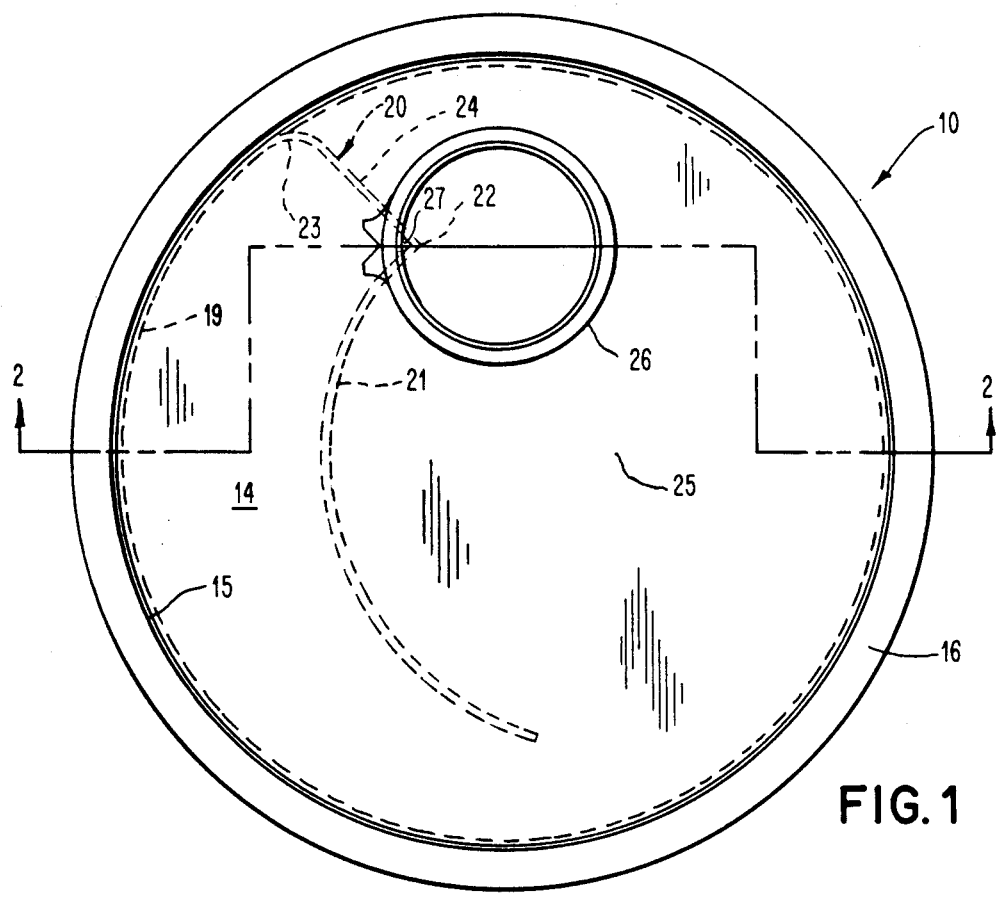
FIG. 1 is a top plan view of one form of an end closure of the present invention having score lines for rupturing to enable opening of the end closure.

Referring to the drawings and particularly FIG. 1, there is shown an end closure 10 for closing an open end 11 (see FIG. 2) of a container 12 such as a can, for example. The container 12 may be a spiral wound paper can, for example, lined with an aluminum foil 12' having a polyethylene film laminate 13 to seal and function as a coating.

The end closure 10 could be welded ultrasonically to the polyethylene film laminate 13, for example, of the container 12 as one means of sealing the end closure 10 to the container 12. The end closure 10 also could be sealed to the container 12 by an adhesive such as glue, for example. Another means of attaching the end closure 10 in a sealing relation to the container 12 could be by induction heat sealing if the materials of the end closure 10 and the container 12 are similar such as polyethylene and polypropylene, for example, and they melt at similar temperatures.

The end closure 10 may be formed of any suitable thermal plastic such as linear low density polyethylene, low density polyethylene, high density polyethylene, polypropylene, polycarbonates, and nylon, for example. Any other suitable material capable of injection molding may be utilized to form the end closure 10.

The end closure 10, which is circular shaped although it could be any shape depending on the shape of the open end 11 of the container 12, includes a main panel or top 14 having an annular surrounding portion 15, which is a skirt, for example, at its periphery. The annular surrounding portion 15 extends substantially perpendicular from the main panel 14 but at an angle slightly greater than 90° such as 92°, for example.

The end of the annular surrounding portion 15 (see FIG. 2) remote from the main panel 14 has a first annular portion 16 extending outwardly therefrom substantially perpendicular thereto and substantially parallel to the main panel 14. A second annular portion 17 extends from the end of the first annular portion 16 substantially perpendicular thereto. This enables formation of a groove 18 between the annular surrounding portion 15, the first annular portion 16, and the second annular portion 17 so that the groove 18 receives the container 12 for sealing relation therewith.

As shown in FIG. 1, the main panel 14, which is substantially flat, of the end closure 10 has a peripheral score line 19 at its junction with the annular surrounding portion 15. The peripheral score line 19 is continuous and extends around the entire circumference of the main panel 14.

The main panel 14 has a first score line 20 extending from the peripheral score line 19 and a second score line 21 extending from the first score line 20. The first score line 20 and the second score line 21 have a junction at a score point 22.

The first score line 20 includes a curved portion 23 extending for a short distance from the peripheral score line 19 and a straight portion 24 extending from the curved portion 23 to the score point 22. While the portion 23 of the first score line 20 is preferably curved, it should be understood that the entire length of the first score line 20 could be straight, if desired. The first score line 20 also could be curved for its entire length, if desired.

The second score line 21 is a portion of a circle having a different center than the center of the main panel 14. The second score line 21 has its center 25 displaced from the center of the main panel 14. If desired, the second score line 21 could be formed on the same center as the main panel 14; this is the center of the peripheral score line 19. However, it is preferred for the distance between the second score line 21 and the peripheral score line 19 to decrease to enable easier rupturing of the score lines 19-21 by pulling on a pull ring 26.

Figure 2:
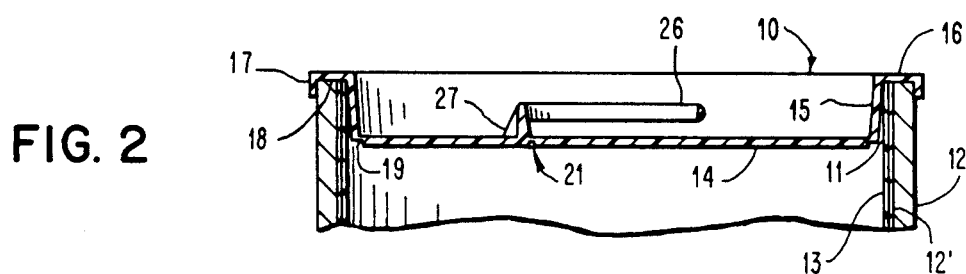
FIG. 2 is a sectional view of the end closure of FIG. 1 and taken along line 2—2 of FIG. 1 and showing the end closure mounted on the end of a can.

The pull ring 26 is disposed in spaced and substantially parallel relation to the top or main panel 14 as shown in FIG. 2. The pull ring 26 is connected to the main panel 14 by a tenon or connecting portion 27. The tenon 27 extends from inside of the score point 22 (see FIG. 1) to a portion of the inner diameter of the pull ring 26. The tenon 27 also extends to a portion of the main panel 14 exterior of the outer diameter of the pull ring 26 as shown in FIG. 2. However, as shown in FIG. 1, no portion of the tenon 27 crosses any portion of the score lines 20 and 21.

The pull ring 26 has an inner diameter several times larger than its thickness. The tenon 27 spaces the pull ring 26 further from the main panel 14 than the thickness of the pull ring 26. For example, the pull ring 26 may have an inner diameter of 0.750", a thickness of 0.030", and a distance of the pull ring 26 from the main panel 14 of 0.125".

By having the first score line 20 and the second score line 21 intersect at a substantially right angle at the score point 22, rupturing of the score lines 20 and 21 is easier to start by pulling on the pull ring 26. It should be understood that the first score line 20 and the second score line 21 could have other angles of intersection but rupturing of the score lines 20 and 21 would not be as easy to start as with the sharp point produced by the substantially perpendicular intersection of the first score line 20 and the second score line 21.

Pulling on the pull ring 26 causes initial rupturing along the first score line 20 and the second score line 21. When rupturing along the first score line 20 is completed, rupturing occurs along a portion of the peripheral score line 19 in conjunction with rupturing of the remainder of the second score line 21. When rupturing of the second score line 21 is completed, the remainder of the peripheral score line 19 is ruptured to remove the main panel 14 and provide access to the interior of the container 12 (see FIG. 2).

Figure 4:
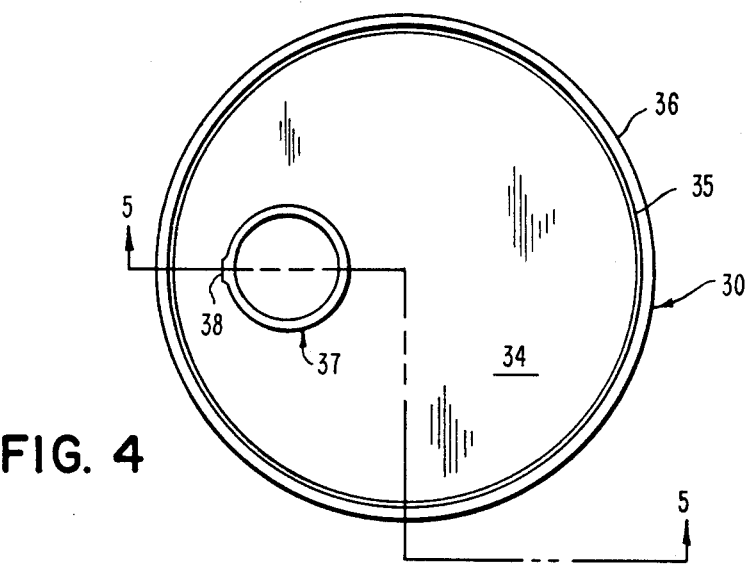
FIG. 4 is a top plan view of another form of an end closure of the present invention having a friction fit within an open end of a can with the end closure capable of being used again to close the open end of the can.
Figure 5:
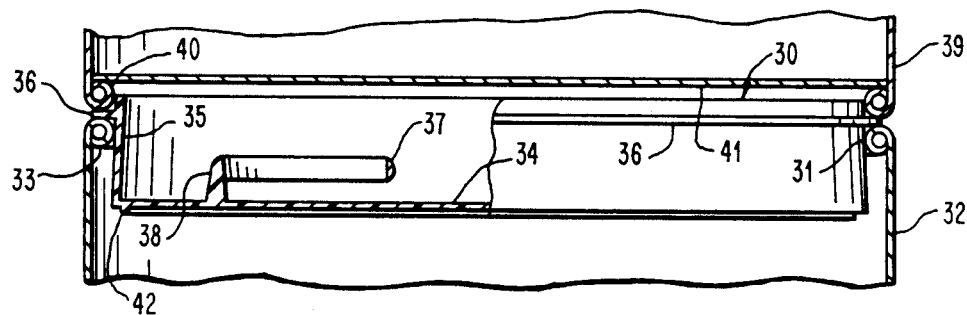
FIG. 5 is a sectional view, partly in elevation, of the end closure of FIG. 4 and taken along line 5—5 of FIG. 4 and shown disposed in a can with another can resting thereon.

Referring to FIG. 4, there is shown an end closure 30 formed without any score lines and utilized for closing an open end 31 (see FIG. 5) of a container 32 such as a can, for example. The container 32 has a bead 33 at its upper end with which the end closure 30 has a tight friction fit. There is usually a frangible seal (not shown) within the container 32 since the end closure 30 has only a friction fit with the bead 33. The container 32 may be made of spiral wound cardboard, for example.

The end closure 30 includes a main panel 34, which is substantially flat, having an annular surrounding portion 35 extending from its periphery at an angle slightly less than 90° and preferably 87°. This angular relation insures that there is a tight friction fit of the end closure 30 within the open end 31 of the container 32 through engagement of the annular surrounding portion 35 with the bead 33 of the container 32. The annular surrounding portion 35 has an annular flange 36 extending therefrom near the end of the annular surrounding portion 35 remote from the main panel 34.

The end closure 30 has a pull ring 37 disposed in spaced and substantially parallel relation to the main panel 34 and connected to the main panel 34 by a tenon or connecting portion 38. Thus, pulling on the pull ring 37 will remove the end closure 30 from the open end 31 of the container 32. The inner diameter of the pull ring 37 is several times larger than its thickness, and the tenon 38 spaces the pull ring 37 farther from the main panel 34 than the thickness of the pull ring 37.

Another container 39, which is the same as the container 32, can be mounted on the annular flange 36 of the end closure 30 on the container 32 in a stacked relation. The container 39 has its bottom bead 40 resting on the annular flange 36 of the end closure 30. The container 39 has a closure 41 for closing its bottom end.

Figure 6:
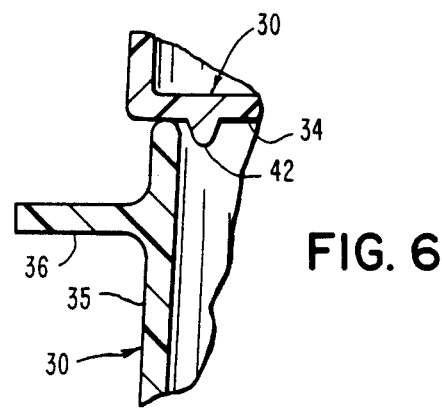
FIG. 6 is an enlarged fragmentary sectional view of a portion of the end closure of FIG. 4 showing it in a stacking arrangement with another of the end closures of FIG. 4.

As shown in FIG. 6, the main panel 34 has an annular ring 42 extending from its surface opposite to that from which the tenon 38 (see FIG. 5) extends. The ring 42 (see FIG. 6) is utilized to enable stacking of the end closures 30 in a stacking arrangement since the stacking ring 42 is inside of the end of the annular surrounding portion 35 of the lower end closure 30.

Figure 7:
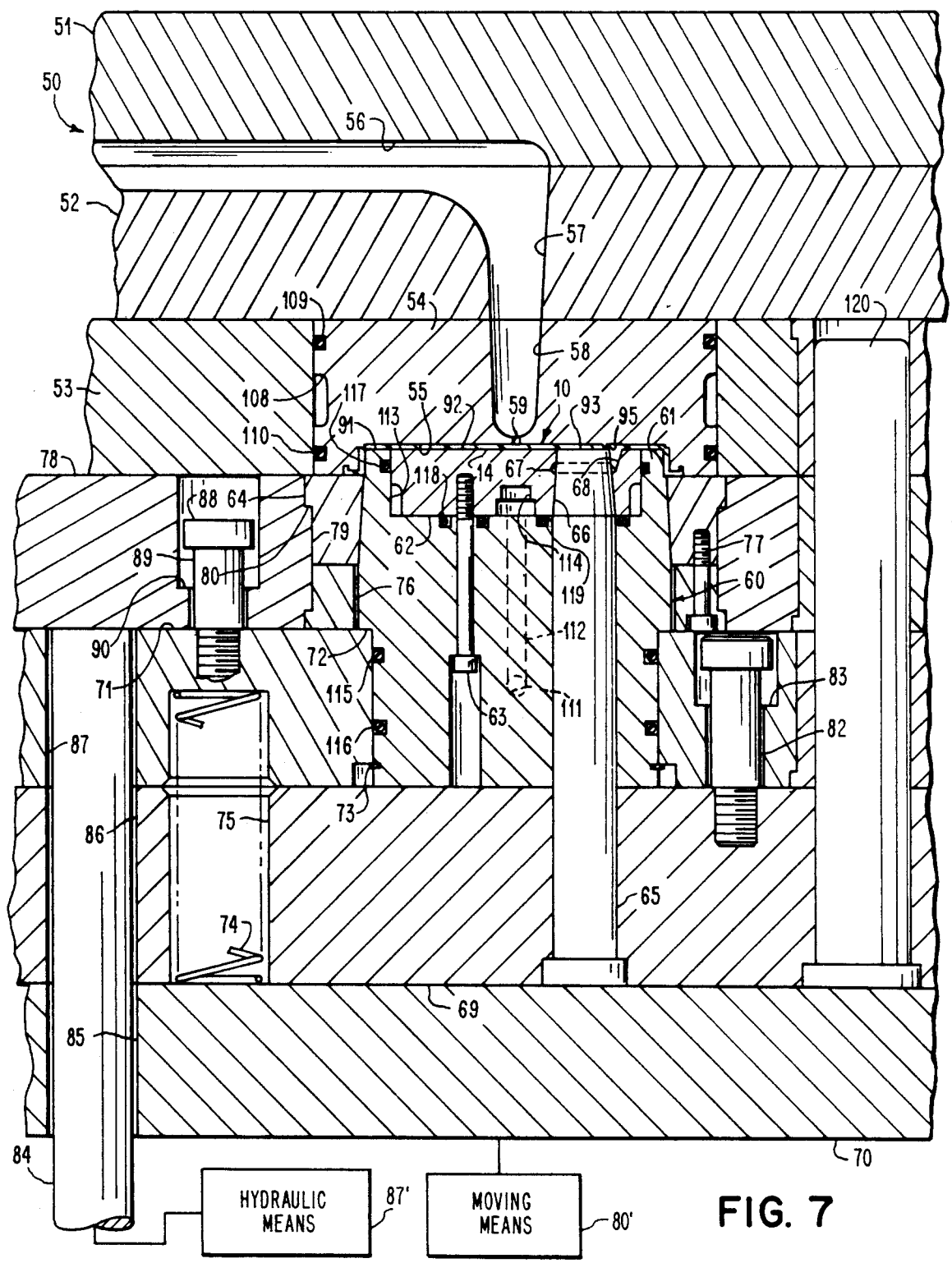
FIG. 7 is a sectional view, partly schematic, of a portion of a molding apparatus for forming the end closure of FIG. 1 with the molding apparatus in its closed or molding position and taken along line 7—7 of FIG. 10.

Referring to FIG. 7, there is shown a molding apparatus 50 for forming the end closure 10 by injection molding. The molding apparatus 50 includes a stationary top clamp plate 51, a runner plate 52, and a cavity plate 53 connected to each other. A cavity insert 54 is mounted within the cavity plate 53 and has a recess or cavity 55 (see FIG. 8) therein.

The stationary top clamp plate 51 (see FIG. 7) and the runner plate 52 cooperate to form a passage 56 therebetween and communicating with a passage 57 in the runner plate 52 and a passage 58 in the cavity insert 54. Molten plastic flows through the passages 56-58 and an orifice 59 at the end of the passage 58 into the recess 55 (see FIG. 8) in the cavity insert 54.

The end closure 10 is molded between the recess 55 in the cavity insert 54, a movable core 60 having an annular portion 61 extending into the recess 55, a core plug 62 secured by screws 63 (one shown) to the movable core 60 and surrounded by the annular portion 61 of the movable core 60, a stripper ring 64 surrounding part of the annular portion 61 of the movable core 60, and a handle shaft pin 65 extending into a passage 66 in the core plug 62. The core plug 62 has a cavity 67 (see FIG. 9) surrounding the passage 66 communicating through a passage 68 in the core plug 62 with the recess 55 in the cavity insert 54 to allow molten plastic to be supplied from the recess 55 to the cavity 67. The passage 68 is formed in the core plug 62 and communicates with the passage 66 when the handle shaft pin 65 is removed. Accordingly, the handle shaft pin 65 must be in the position of FIG. 7 for the passage 68 to have plastic flow into the cavity 67. Thus, the pull ring 26 (see FIG. 8) of the second end closure 10 is formed in the cavity 67 (see FIG. 7) and the tenon 27 (see FIG. 8) is formed in the passage 68 (see FIG. 7) when the handle shaft pin 65 is in the position of FIG. 7.

The handle shaft pin 65 is mounted on a force plate 69, which is attached to a movable bottom clamp plate 70 for movement therewith. A movable core plate 71, which has its upper end abutting a shoulder 72 of the movable core 60 and retained thereagainst by a retaining ring 73, abuts the force plate 69 when the molding apparatus 50 is in the closed position of FIG. 7. However, the movable core plate 71 is continuously urged away from the force plate 69 by springs 74 (one shown), which extend between the movable bottom clamp plate 70 and the movable core plate 71. The springs 74 extend through passages 75 in the force plate 69.

The stripper ring 64 has a stripper ring retainer 76 secured thereto by screws 77 (one shown). A stripper plate 78, which has a portion 79 projecting into an annular recess 80 formed in portions of the stripper ring 64 and the stripper ring retainer 76, rests on top of the movable core plate 71 when the molding apparatus 50 is in the closed position of FIG. 7. The stripper plate 78 holds the stripper ring 64 in the desired position.

After the end closure 10 has been formed by supplying the molten plastic through the orifice 59 to the recess 55 in the cavity insert 54 with the molding apparatus 50 in the closed position of FIG. 7, the movable bottom clamp plate 70 is moved in a direction away from the stationary top clamp plate 51, the runner plate 52, and the cavity plate 53 by suitable moving means 80' such as a hydraulic cylinder, for example. This movement of the movable bottom clamp plate 70 initially carries with it the force plate 69 and the handle shaft pin 65.

Because of the force of the springs 74, the movable core plate 71, the movable core 60, the core plug 62, the stripper ring 64, the stripper ring retainer 76, and the stripper plate 78 do not initially move with the movable bottom clamp plate 70. As a result, the handle shaft pin 65 is initially withdrawn from the upper portion of the passage 66 in the core plug 62 so that the pull ring 26 (see FIG. 8) is no longer held by the handle shaft pin 65 within the cavity 67 (see FIG. 7) in the core plug 62 and the tenon 27 (see FIG. 8) is no longer held within the passage 68 (see FIG. 7) in the core plug 62.

Figure 8:
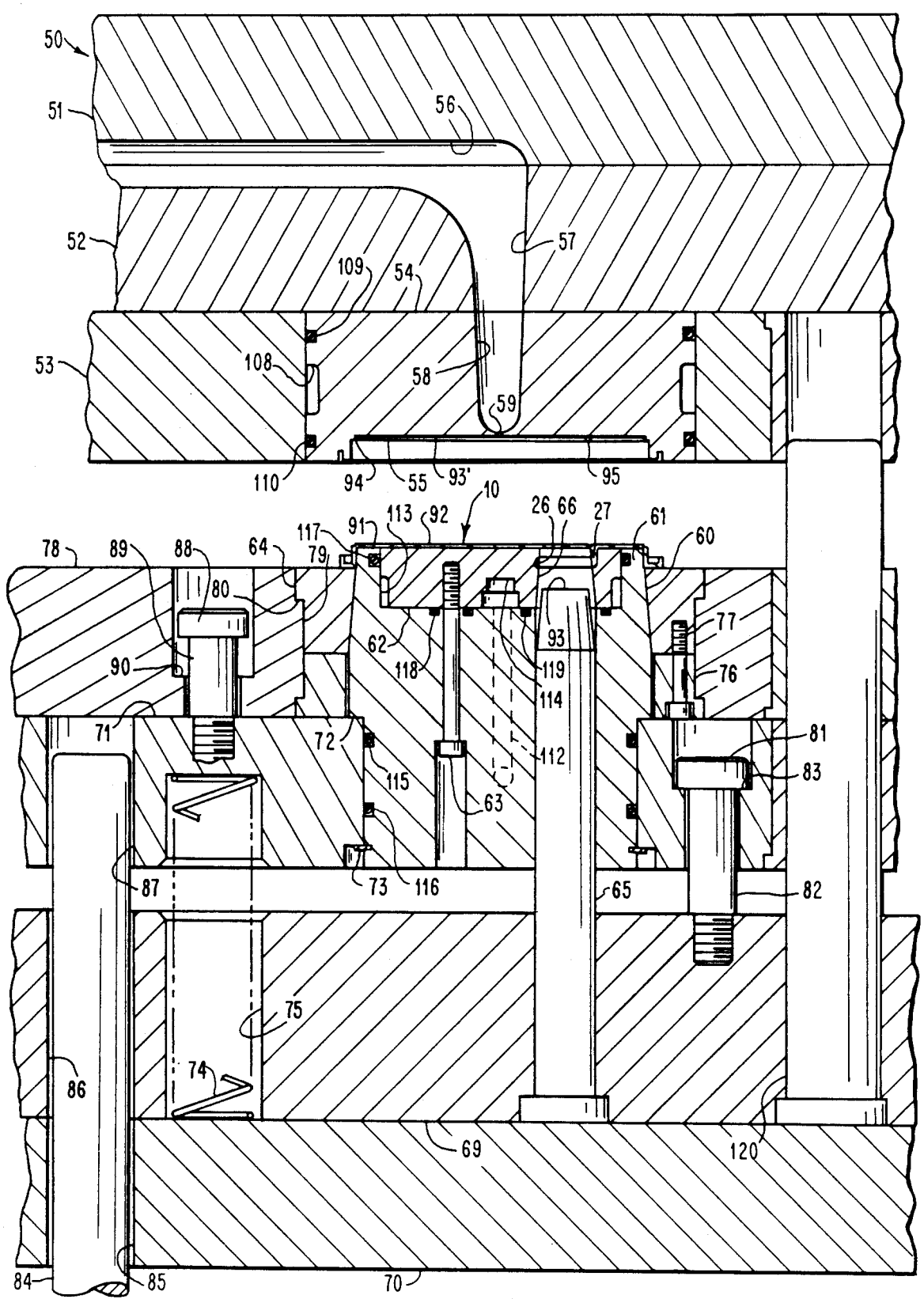
FIG. 8 is a fragmentary sectional view of a portion of the molding apparatus of FIG. 7 with molding of the end closure having been completed and the molded end closure removed from a cavity of the molding apparatus.

When the springs 74 are fully extended, there will be a space between the force plate 69 and the movable core plate 71 as shown in FIG. 8. At this time, each of heads 81 (one shown) of bolts 82 (one shown), which are attached to the force plate 69, engages one of a plurality of annular shoulders 83 (one shown) in the movable core plate 71 to cause the movable core plate 71 to follow the movement of the movable bottom clamp plate 70. This also causes the movable core 60, the core plug 62, the stripper ring 64, the stripper ring retainer 76, and the stripper plate 78 to move therewith.

After separation of the force plate 69 from the movable core plate 71, continued movement of the movable bottom clamp plate 70 withdraws the core plug 62 and the annular portion 61 of the movable core 60 from the cavity 55 in the cavity insert 54 to the position of FIG. 8. In this position, the end closure 10 is still supported on the core plug 62, the annular portion 61 of the movable core 60, and the stripper ring 64.

Figure 9:
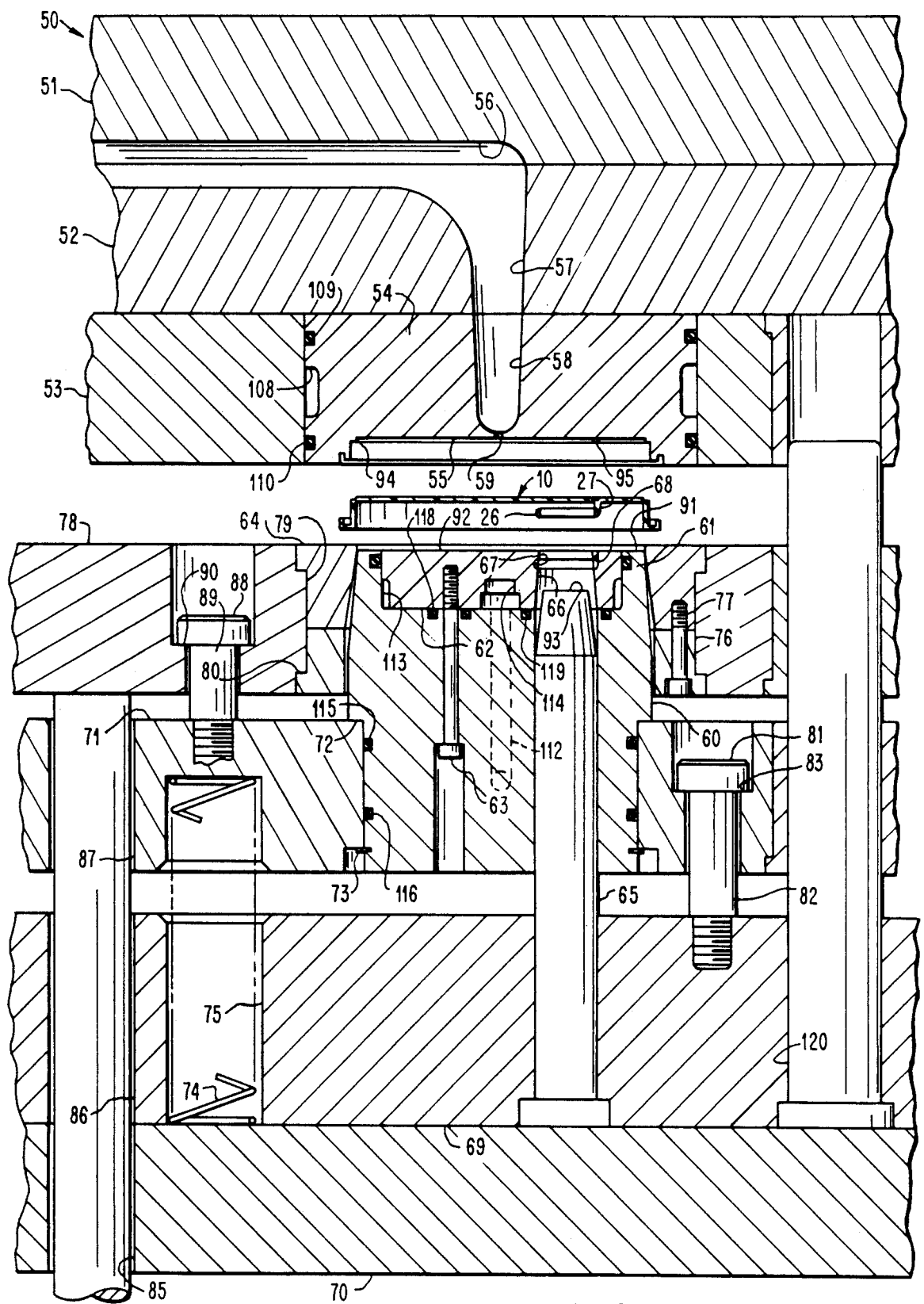
FIG. 9 is a fragmentary sectional view of a portion of the molding apparatus of FIG. 7 in its fully open position with the molded one-piece end closure stripped from the molding apparatus.

With the molding apparatus 50 in the position of FIG. 8, knock-out rods or bars 84 (one shown), which extend through aligned passages 85 (one shown) in the movable bottom clamp plate 70, passages 86 (one shown) in the force plate 69, and passages 87 (one shown) in the movable core plate 71, are activated by suitable moving means such as hydraulic means 87' (see FIG. 7), for example, to move the stripper plate 78 away from the movable core plate 71 as shown in FIG. 9. The movement of the stripper plate 78 by the knock-out rods 84 (see FIG. 8) is limited by each of a plurality of heads 88 (one shown) of bolts 89 (one shown), which are attached to the movable core plate 71, engaging one of a plurality of annular shoulders 90 (one shown) in the stripper plate 78. This controls maximum movement of the stripper plate 78 away from the movable core plate 71. This movement of the stripper plate 78 moves the stripper ring 64 beyond the annular portion 61 of the movable core 60, as shown in FIG. 9, to strip the end closure 10 from the movable core 60 and the core plug 62.

When the molding apparatus 50 is in the closed position of FIG. 7, the annular portion 61 of the movable core 60 has its end surface 91 in the same plane as an end surface 92 of the core plug 62, and an end surface 93 of the handle shaft pin 65. This insures that the main panel 14 of the end closure 10 is substantially flat and in a single plane.

Figure 3:
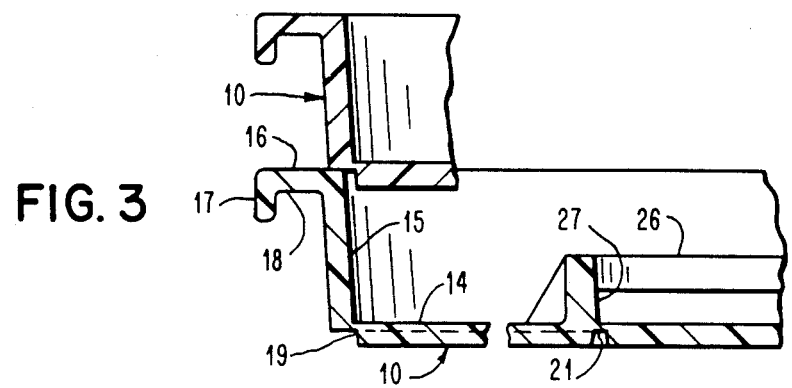
FIG. 3 is an enlarged fragmentary sectional view of a portion of the end closure of FIG. 1 and showing a second end closure stacked thereon.

To form the peripheral score line 19 (see FIG. 1) of the end closure 10, the recess 55 (see FIG. 8) in the cavity insert 54 has its wall or surface 93' formed with a step 94 extending around its periphery. This produces a relatively thin portion of the main panel 14 (see FIG. 3) of the end closure 10 to create the peripheral score line 19.

A projection 95 (see FIG. 8) extends from the wall or surface 93' of the recess 55 and has the configuration of the first score line 20 (see FIG. 1) and the second score line 21 of the end closure 10. This produces a relatively thin portion of the main panel 14 to create the first score line 20 and the second score line 21.

Figure 11:
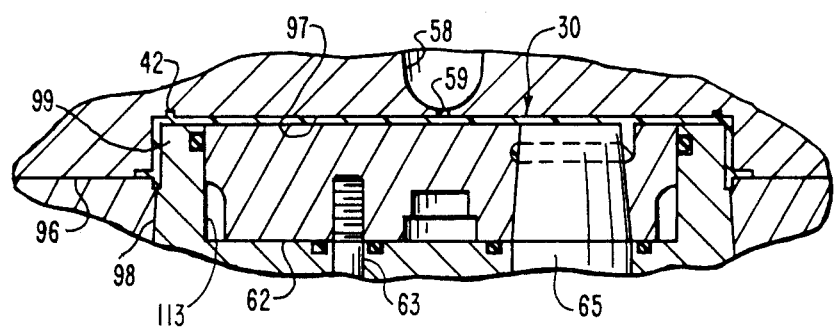
FIG. 11 is a fragmentary sectional view of a portion of a molding apparatus, similar to FIGS. 7-9, but showing the different structure employed for molding the end closure of FIGS. 4-6.
Figure 13:
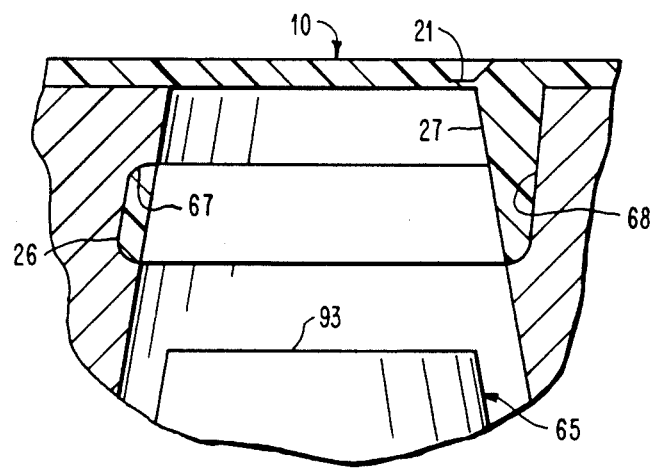
FIG. 13 is an enlarged fragmentary sectional view of a portion of the molding apparatus of FIGS. 7-9.

When the end closure 30 (see FIG. 4) is to be formed by the molding apparatus 50 (see FIG. 7), it is necessary to have a cavity insert 96 (see FIG. 11) instead of the cavity insert 54 (see FIG. 7) with the cavity insert 96 (see FIG. 11) having its recess 97 shaped differently. It also is necessary to replace the movable core 60 (see FIG. 7) with a movable core 98 (see FIG. 11) having its annular portion 99 configured differently. The configuration of the core plug 62 will not have to be changed. The use of the cavity insert 96 in the molding apparatus 50 (see FIG. 7) enables the end closure 30 (see FIG. 4) to be produced.

Figure 12:
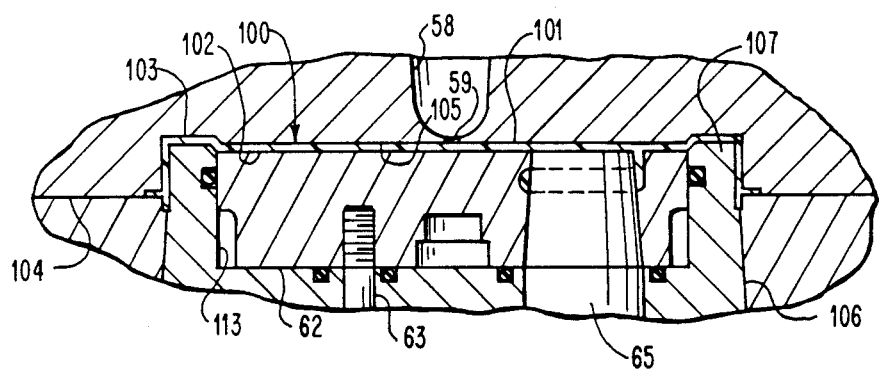
FIG. 12 is a fragmentary sectional view of a portion of a molding apparatus, similar to FIGS. 7-9, but showing the different structure employed for molding an end closure without score lines.

Referring to FIG. 12, there is shown an end closure 100, which is similar to the end closure 30 (see FIG. 4) except that it has a main panel 101 (see FIG. 12) formed with a recess central portion 102 and an outer surrounding portion 103. This also requires a cavity insert 104 instead of the cavity insert 54 (see FIG. 7). The cavity insert 104 (see FIG. 12) has a different shaped recess or cavity 105. This also requires a different shaped movable core 106 with its annular portion 107 being shaped differently.

The operation of the molding apparatus 50 (see FIG. 7) to produce either the end closure 30 (see FIG. 4) or the end closure 100 (see FIG. 12) is the same as that described for forming the end closure 10 (see FIG. 1).

Coolant such as water is supplied to the cavity insert 54 (see FIG. 7) through a coolant channel 108. O-rings 109 and 110 are disposed on opposite sides of the coolant channel 108 to prevent leakage.

Coolant also is supplied to the core plug 62 through a substantially horizontal coolant channel 111 (see FIG. 10) in the movable core plate 71 (see FIG. 7), a substantially vertical coolant channel 112 (see FIG. 10) in the movable core 60 (see FIG. 7), and an annular coolant channel 113 in the core plug 62. The coolant channel 112 (see FIG. 10) also supplies coolant through the coolant channel 113 for a second coolant channel 114 in the core plug 62 (see FIG. 7). O-rings 115 and 116 in the movable core 60 on opposite sides of the coolant channel 112 (see FIG. 10) adjacent its connection to the coolant channel 111 prevent leakage between the movable core plate 71 (see FIG. 7) and the movable core 60. O-rings 117, 118, and 119 are utilized to prevent leakage of the coolant between the movable core 60 and the core plug 62. It should be understood that the coolant channels 108, 113, and 114 have return passages such as coolant channels 119' (see FIG. 10) to return the coolant to the source of coolant.

Figure 10:
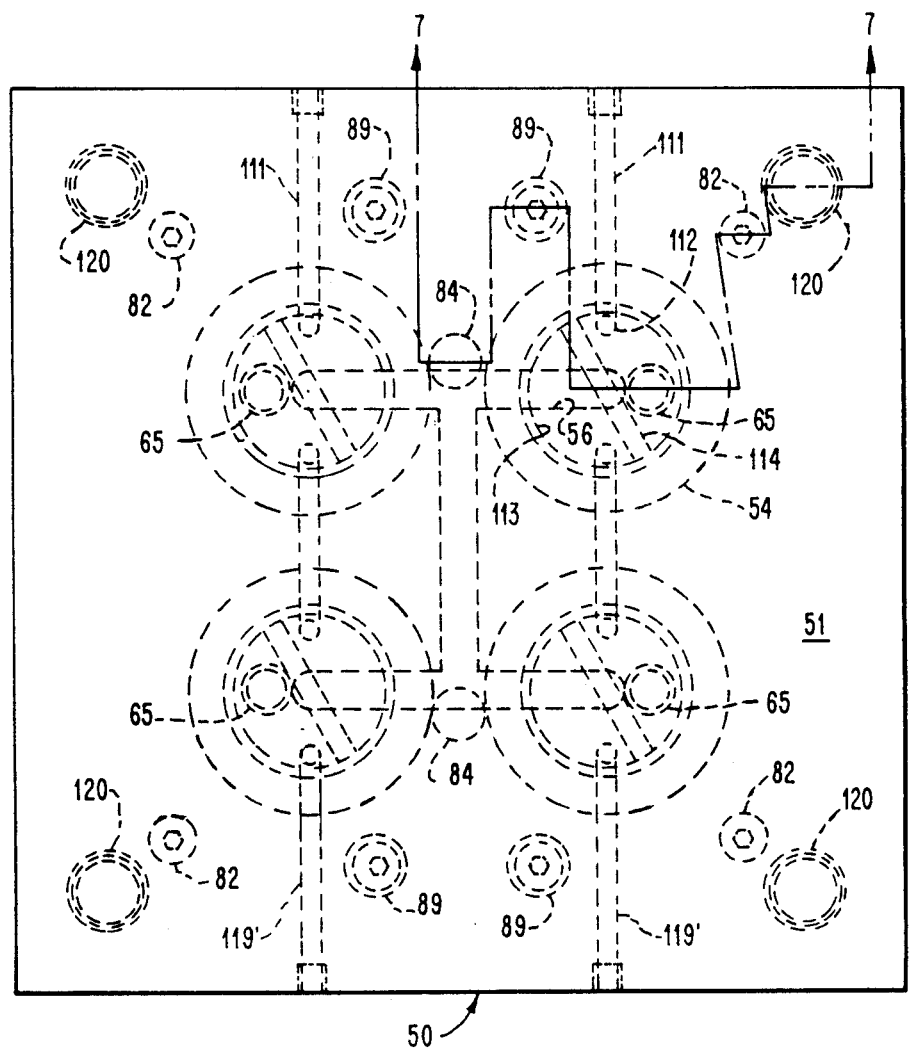
FIG. 10 is a side elevational view of the molding apparatus of FIGS. 7-9 for forming the end closure of FIG. 1.

Four of the end closures 10 (see FIG. 1) could be simultaneously formed in the molding apparatus 50 of FIG. 10. The cavity plate 53 (see FIG. 7) has four of the cavity inserts 54. There are four of the movable cores 60, the core plugs 62, the stripper rings 64, the handle shaft pins 65, and the stripper ring retainers 76.

As shown in FIG. 10, guide pins 120 are employed adjacent the four corners of the molding apparatus 50. The guide pins 120 are mounted on the movable bottom clamp plate 70 (see FIG. 7).

Figure 14:
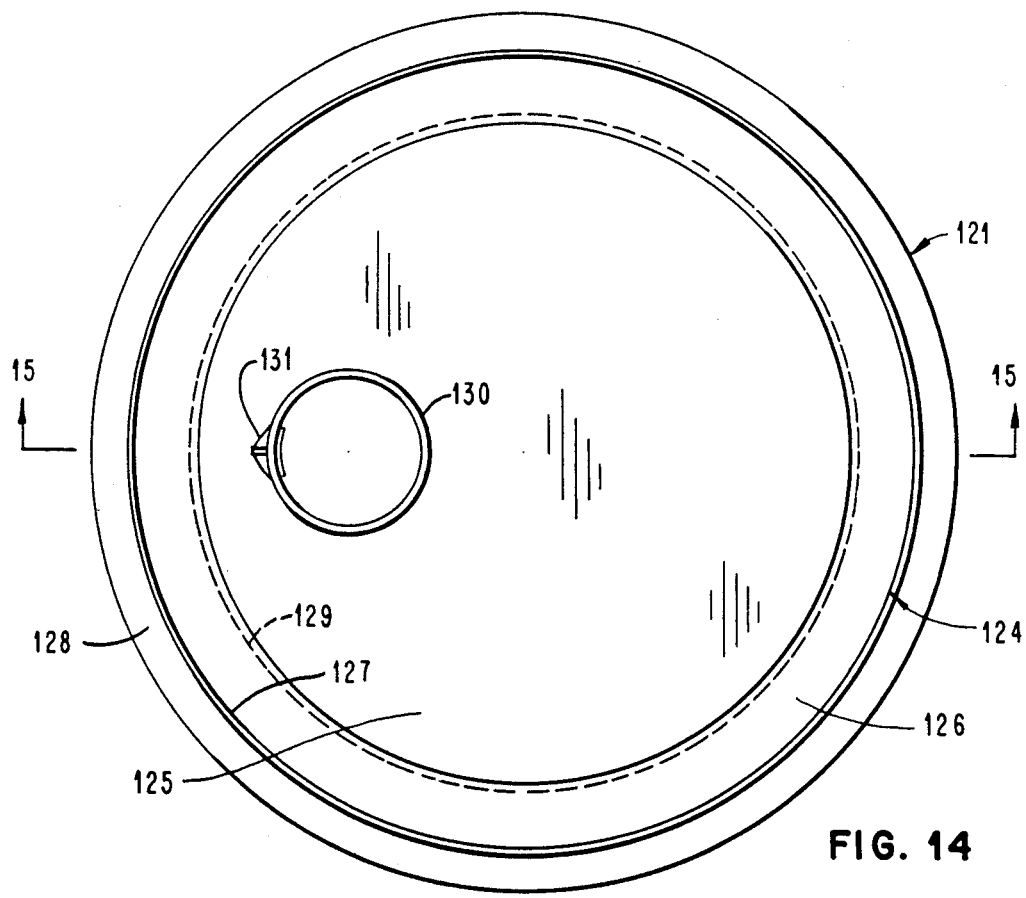
FIG. 14 is a top plan view of a further embodiment of an end closure of the present invention having a single continuous score line for rupturing to enable opening of the end closure.

Referring to FIG. 14, there is shown an end closure 121 for closing an open end 122 (see FIG. 15) of a container 123 such as a can, for example. The container 123 may be the same as the container 12 (see FIG. 2), for example.

The end closure 121 (see FIG. 15), which is circular shaped although it could be any shape depending on the shape of the open end 122 of the container 123, includes a main panel or top 124, which comprises a central portion 125 surrounded by an outer portion 126. The outer portion 126 of the main panel 124 has an annular surrounding portion 127, which is a skirt, for example, at its periphery. The annular surrounding portion 127 extends substantially perpendicular from the outer portion 126 of the main panel 124 but at an angle slightly greater than 90° such as 92°, for example.

The end of the annular surrounding portion 127 remote from the main panel 124 has an annular flange 128 extending outwardly therefrom substantially perpendicular thereto and substantially parallel to the main panel 124. The annular flange 128 may be attached in a sealing relation to the container 123 by any suitable means such as adhesive, for example.

Figure 15:
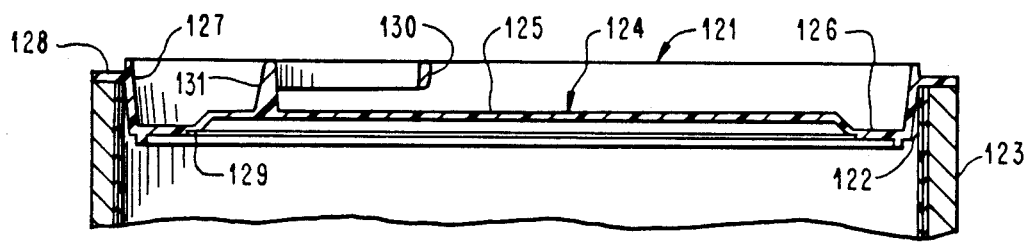
FIG. 15 is a sectional view of the end closure of FIG. 14 showing the end closure mounted on the end of a container and taken along line 15—15 of FIG. 14.

As shown in FIG. 15, the outer portion 126 of the main panel 124 is in a different plane than the central portion 125 of the main panel 124. As shown in FIG. 14, a single continuous score line 129 is formed in the outer portion 126 of the main panel 124 at the periphery of the central portion 125. Thus, the single continuous score line 129 is a peripheral score line surrounding the central portion 125 of the main panel 124 and is adjacent the junction of the central portion 125 and the outer portion 126.

As shown in FIG. 15, a pull ring 130 is disposed in spaced and substantially parallel relation to the main panel 124. The pull ring 130 is connected to the central portion 125 of the main panel 124 by a tenon or connecting portion 131. The tenon 131 extends from the central portion 125 to the pull ring 130. The tenon 131 also extends to a portion of the central portion 125 of the main panel 124 exterior of the outer diameter of the pull ring 130 as shown in FIG. 15.

The pull ring 130 has the same relative dimensions as the pull ring 26 (see FIG. 1). The pull ring 130 (see FIG. 14) has its center spaced from the center of the main panel 124. The tenon 131 is positioned so that initial pulling on the pull ring 130 causes rupturing initially of the portion of the single continuous score line 129 adjacent the tenon 131.

The complete severing of the single continuous score line 129 results in the central portion 125 of the main panel 124 being completely severed from the outer portion 126 of the main panel 124. Because the pull ring 130 remains attached to the main panel 124, the central portion 125 of the main panel 124 may be easily lifted from the remainder of the end closure 121 to provide access to the interior of the container 123 (see FIG. 15).

Figure 16:
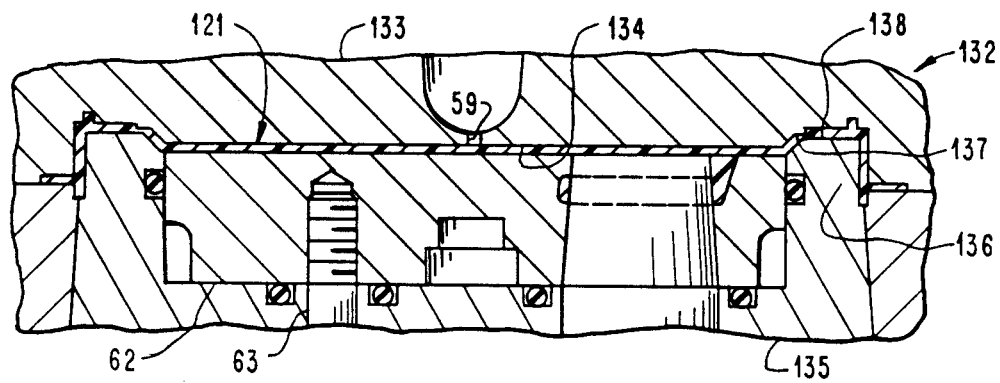
FIG. 16 is a fragmentary sectional view of a portion of a molding apparatus, similar to FIGS. 7-9, but showing the different structure employed for molding the end closure of FIG. 14.

Referring to FIG. 16, there is shown a molding apparatus 132, which is substantially the same as the molding apparatus 50 (see FIG. 7), for forming the end closure 121 (see FIG. 16). A cavity insert 133 is utilized instead of the cavity insert 54 (see FIG. 7). The cavity insert 133 (see FIG. 16) has a different shaped recess or cavity 134. The molding apparatus 132 also requires a different shaped movable core 135 than the core 60 (see FIG. 7) with the core 135 (see FIG. 16) having a different shaped annular portion 136.

The recess 134 in the cavity insert 133 has a molding surface 137 positioned very close to a molding surface 138 of the annular portion 136 of the core 135 for forming the single continuous score line 129 (see FIG. 14) in the main panel 124 of the end closure 121. The operation of the molding apparatus 132 (see FIG. 16) is the same as the operation of the molding apparatus 50 (see FIG. 7) for forming the end closure 10 (see FIG. 1).

Figure 17:
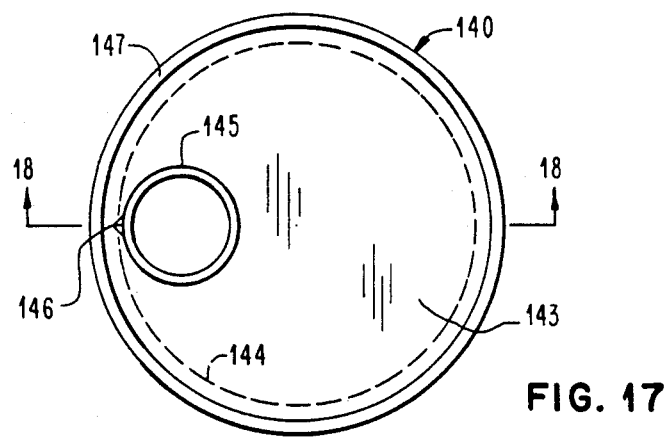
FIG. 17 is a top plan view of another form of an end closure of the present invention in which the end closure is formed integral with a wall of a container and the end closure has a single continuous score line for rupturing to enable opening of the end closure.
Figure 18:
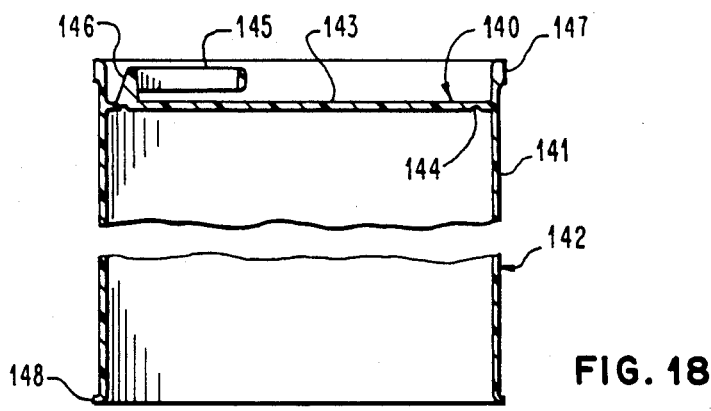
FIG. 18 is a fragmentary longitudinal sectional view of the integral end closure and container wall of FIG. 17 and taken along line 18—18 of FIG. 17.

Referring to FIGS. 17 and 18, there is shown an end closure 140 formed integral with a cylindrical wall 141 of a container 142. The end closure 140 and the container 142 may be formed of any suitable thermoplastic such as high density polyethylene, polypropylene, or styrene, for example. Any other suitable material capable of injection molding may be utilized to form the end closure 140 and the container 142. The cylindrical wall 141 of the container 142, which is circular shaped although it could be any shape, is formed integral with a main panel or top 143, which is circular shaped, of the end closure 140.

The main panel 143, which is substantially flat, has a single continuous score line 144 formed therein. While the single continuous line 144 is shown spaced from the cylindrical wall 141 of the container 142, the single continuous score line 144 could be in the main panel 143 adjacent its junction with the cylindrical wall 141 of the container 142 if desired.

A pull ring 145 is disposed in spaced parallel relation to the main panel 143 as shown in FIG. 18. The pull ring 145 is connected to the main panel 143 by a tenon or connecting portion 146. The tenon 146 extends from the main panel 143 inside of the continuous score line 144 to a portion of the pull ring 145. The tenon 146 extends to a portion of the main panel 143 exterior of the outer diameter of the pull ring 145 as shown in FIG. 17. While the tenon 146 is adjacent the single continuous score line 144, no portion of the tenon 146 crosses any portion of the single continuous score line 144.

The pull ring 145 has the same relative dimensions as the pull ring 26 (see FIG. 1). The center of the pull ring 145 (see FIG. 17) is spaced from the center of the main panel 143.

The tenon 146 is positioned so that initial pulling on the pull ring 145 causes rupturing initially of the portion of the single continuous score line 144 adjacent the tenon 146. The complete severing of the single continuous score line 144 results in a portion of the main panel 143 within the single continuous score line 144 being completely severed from the portion of the main panel 143 exterior of the single continuous score line 144. The pull ring 145 remains attached to the severed portion of the main panel 143 so that it may be easily lifted from the remainder of the main panel 143 to provide access to the interior of the container 142 (see FIG. 18).

The portion of the cylindrical wall 141 of the container 142 extending beyond the main panel 143 on the same side as the pull ring 145 constitutes an annular surrounding portion at the periphery of the main panel 143 of the end closure 140. The end of the cylindrical wall 141 extends beyond the top of the pull ring 145. The end of the cylindrical wall 141 has an annular flange or bead 147 thereon. The other end of the cylindrical wall 141 of the container 142 has an annular flange or bead 148, which has a slightly smaller outer diameter than the outer diameter of the annular flange or bead 147. The annular flange or bead 148 defines an open end of the container 142 with the open end being closed by a closure (not shown) such as a metal closure cooperating with the bead 148. The flange 147 is of a size to enable a plastic closure to be fitted thereover when the main panel 143 has been removed and it is desired to close this opened end of the container 142 to protect the remaining contents.

Figure 19:
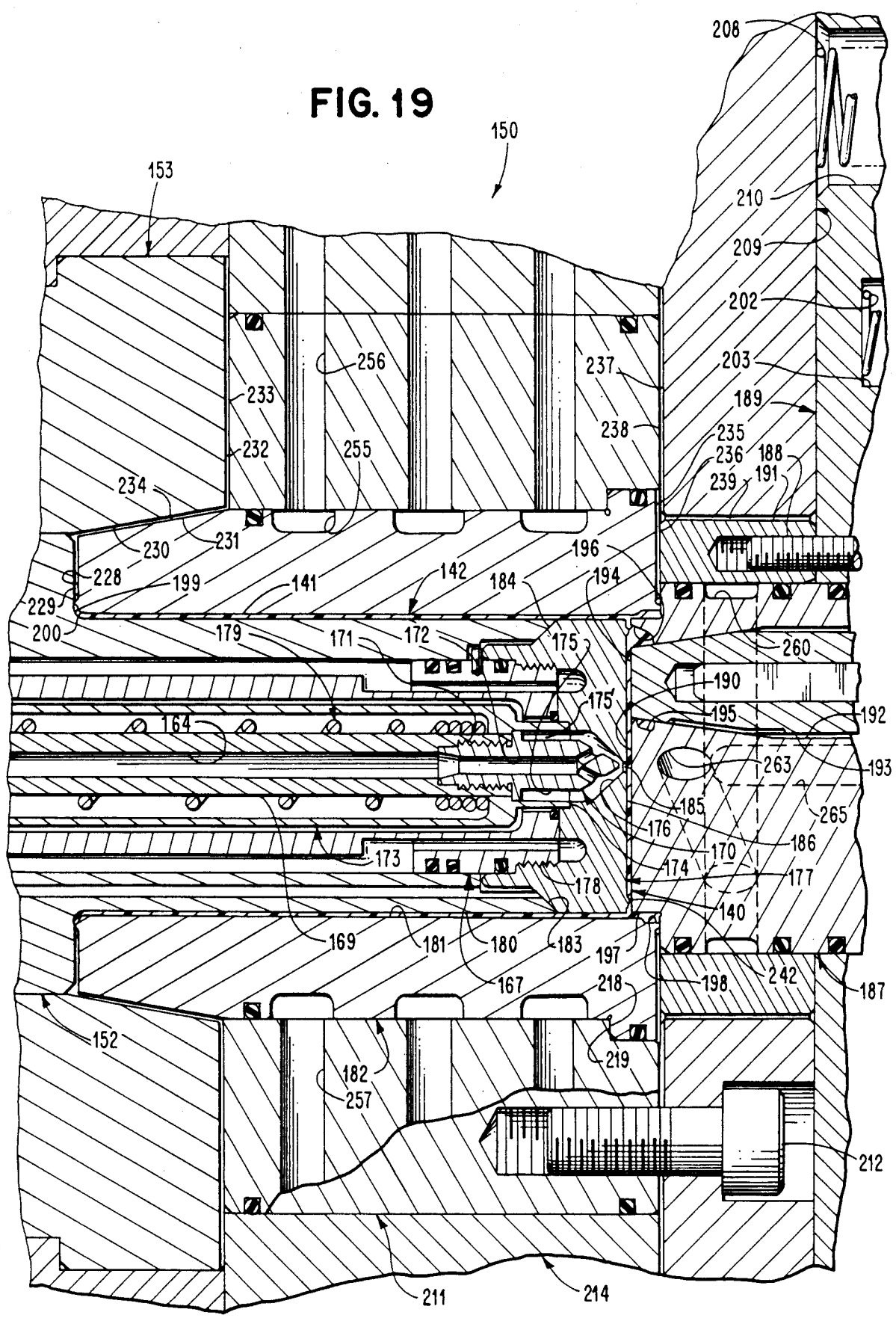
FIG. 19 is a fragmentary sectional view of a portion of a molding apparatus for forming the integral end closure and container wall of FIG. 17 with the molding apparatus in its closed or molding position.

Referring to FIG. 19, there is shown a molding apparatus 150 for forming the end closure 140 (see FIG. 18) and the cylindrical wall 141 of the container 142 integral therewith. The molding apparatus 150 (see FIG. 22) includes a stationary clamp plate 151, a force base 152, a core ring 153, a force plate 154, and a force ring plate 155.

The stationary clamp plate 151 is connected to the force base 152 and to the force plate 154. The force plate 154, which surrounds the force base 152, has the core ring plate 155 connected thereto. The core ring 153, which is surrounded by the core ring plate 155, is connected to the core ring plate 155 by a retainer ring 156.

A heater probe 157 is mounted in the stationary clamp plate 151 and has a passage 158 extending therethrough. The heater probe 157 is retained within the stationary clamp plate 151 by a ring 159, which is secured to the stationary clamp plate 151 by screws (not shown). The heater probe 157 supports a heater band 160 for applying heat to molten plastic flowing through the passage 158 to maintain the plastic molten. The molten plastic is supplied to the passage 158 from a passage 161 in a machine nozzle 162, which fits within a recess 163 in the end of the heater probe 157.

The passage 158 in the heater probe 157 supplies the molten plastic to a passage 164 in a sprue base 165, which is positioned within an enlarged recess 166 in the force base 152. The heater probe 157 has a portion extending into a recess 166' in the sprue base 165, which has a piston shaft 167 attached thereto by screws 168 (one shown). The piston shaft 167 is disposed in surrounding and spaced relation to an elongated portion 169 of the sprue base 165.

The elongated portion 169 of the sprue base 165 has a nozzle tip 170 (see FIG. 19) attached thereto by threads 171. The nozzle 170 has a passage 172 to receive the molten plastic flowing through the passage 164 in the sprue base 165 (see FIG. 22).

A sprue heater shield 173, which is secured to the sprue base 165 by threads 173', is positioned in the space between the elongated portion 169 of the sprue base 165 and the piston shaft 167. The sprue heater shield 173 is spaced from both the elongated portion 169 of the sprue base 165 and the piston shaft 167.

The sprue heater shield 173 has a ring 174 (see FIG. 19) at its end and spaced from an outer surface 175 of the nozzle tip 170 to receive molten plastic in an annular space 175' therebetween when it initially flows into the passage 172 in the nozzle tip 170. The molten plastic flows into the annular space 175' and hardens to form insulation around the outer surface 175 of the nozzle tip 170. The nozzle tip 170 extends into a recess 176 in a force cap 177, which is secured by threads 178 to the piston shaft 167.

The plastic is maintained molten by a heater band 179 (see FIG. 22), which comprises a plurality of coils. The desired heat profile is obtained through disposing more of the coils of the heater band 179 at each end of the elongated portion 169 of the sprue base 165 than in the intermediate portion.

The force base 152 has an elongated hollow portion 180 extending into a cavity 181 (see FIG. 19) in a cavity plate 182. The elongated hollow portion 180 of the force base 152 surrounds the piston shaft 167 and is in engagement therewith. The elongated hollow portion 180 of the force base 152 has an angled surface 183 against which an angled surface 184 of the force cap 177 engages during molding of the end closure 140 and the container 142. The angled surfaces 183 and 184 are preferably at 50° to the horizontal although such is not a requisite for satisfactory operation.

During molding, the molten plastic flows from the passage 172 in the nozzle tip 170 into the recess 176 in the force cap 177 and exits therefrom through an orifice 185 in an end surface 186 of the force cap 177. The end surface 186 of the force cap 177 functions as one of its molding surfaces.

A movable core plug 187, which is attached by screws 188 to a movable core 189, has its end surface 190, which is a molding surface, spaced from the end surface 186 of the force cap 177 to form a portion of a recess therebetween into which the molten plastic flows from the orifice 185. The screws 188 also connect a water ring 191 to the movable core 189.

The core plug 187 has a passage 192 extending therethrough with its cross section decreasing towards the end surface 190. The passage 192 has a handle post 193 slidable therein with its end surface 194 in the same plane as the end surface 190 of the core plug 187 and spaced from the end surface 186 of the force cap 177 to form a portion of the recess into which the molten plastic flows from the orifice 185. Thus, the end surface 190 of the core plug 187 and the end surface 194 of the handle post 193 constitute molding surface means for cooperating with the end surface 186 of the force cap 177 to form the main panel 143 (see FIG. 17) of the end closure 140.

The core plug 187 (see FIG. 19) has a cavity 195 surrounding the passage 192 and communicating through a passage 196 in the core plug 187 with the recess into which the molten plastic flows from the orifice 185 in the force cap 177 to allow the molten plastic to be supplied to the cavity 195. The passage 196 is formed in the core plug 187 and communicates with the passage 192 in the core plug 187 when the handle post 193 is removed. Accordingly, the handle post 193 must be in the position of FIG. 19 for plastic to flow through the passage 196 into the cavity 195. Thus, the pull ring 145 (see FIG. 18) of the end closure 140, which is integral with the cylindrical wall 141 of the container 142, is formed in the cavity 195 (see FIG. 19) and the tenon 146 (see FIG. 18) is formed in the passage 196 (see FIG. 19) when the handle post 193 is in the position of FIG. 19.

The core plug 187 has an outer surface 197 spaced from the cavity 181 in the cavity plate 182 to form a portion of the recess in which a portion of the cylindrical wall 141 (see FIG. 18) of the container 142 is formed along with the annular flange or bead 147. The annular flange or bead 147 is formed by an annular groove 198 (see FIG. 19) in the cavity plate 182 adjacent its corner. The remainder of the cylindrical wall 141 (see FIG. 18) is formed in an annular space between the elongated hollow portion 180 (see FIG. 22) of the force base 152 and the wall of the cavity 181 (see FIG. 19) in the cavity plate 182. The annular flange or bead 148 (see FIG. 18) of the free end of the cylindrical wall 141 of the container 142 is formed between a curved surface 199 (see FIG. 19) of the force base 152 and a curved surface 200 of the cavity plate 182.

The handle post 193 (see FIG. 20) is mounted on a movable clamp plate 201 for movement together. The handle post 193 is prevented from rotation by a dowel pin 201' disposed in the handle post 193 and the movable clamp plate 201.

When the molding apparatus 150 is in the closed position of FIG. 19, the movable clamp plate 201 (see FIG. 20) abuts the movable core 189. However, the movable core 189 is continuously urged away from the movable clamp plate 201 by springs 202 (one shown), which extend between the movable clamp plate 201 and the movable core 189. The springs 202 extend into recesses 203 in the movable core 189.

After the end closure 140 (see FIG. 18) and the cylindrical wall 141 of the container 142 have been formed by supplying the molten plastic through the orifice 185 (see FIG. 19) in the force cap 177 with the molding apparatus 150 in the closed position of FIG. 19, the movable clamp plate 201 (see FIG. 20) is moved away from the movable core 189 by suitable moving means 204 such as a hydraulic cylinder, for example. This movement of the movable clamp plate 201 initially carries with it the handle post 193.

Because of the force of the springs 202, the movable core 189 does not initially move with the movable clamp plate 201. As a result, the handle post 193 is initially withdrawn from the portion of the passage 192 in the core plug 187 having the cavity 195 so that the pull ring 145 (see FIG. 17) is no longer held by the handle post 193 (see FIG. 19) within the cavity 195 in the core plug 187.

Figure 20:
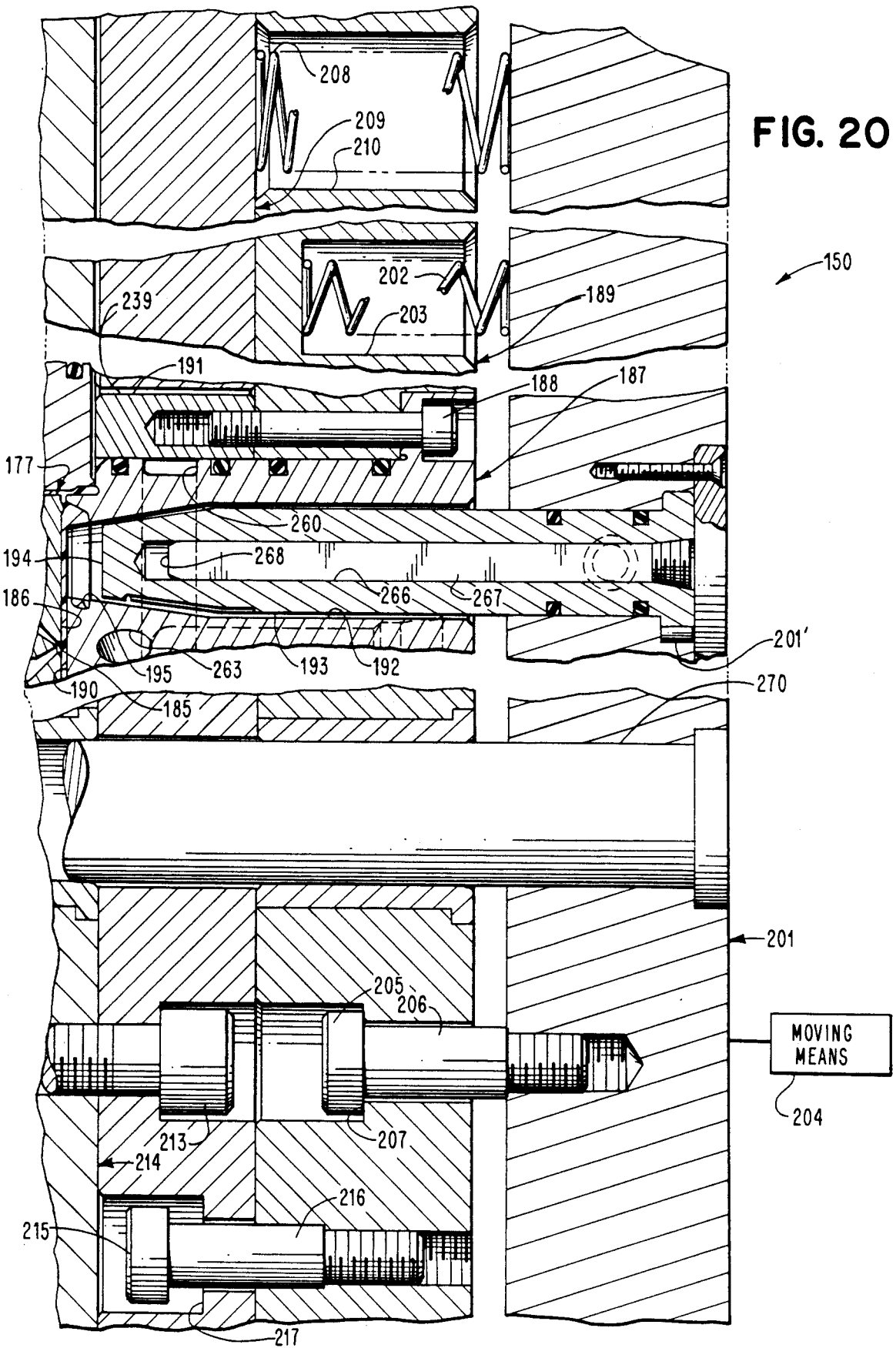
FIG. 20 is a fragmentary sectional view, partly schematic, of a portion of the molding apparatus of FIG. 19 with molding of the integral end closure and container wall completed and the first parting of portions of the molding apparatus completed.

When the springs 202 (see FIG. 20) are fully extended, there will be a space between the movable clamp plate 201 and the movable core 189 as shown in FIG. 20. At this time, each of heads 205 (one shown) of bolts 206 (one shown), which are attached to the movable clamp plate 201, engages one of a plurality of annular shoulders 207 in the movable core 189 to cause the movable core 189 to follow the movement of the movable clamping plate 201. This also causes the movable core plug 187 to move therewith since the movable core plug 187 is attached to the movable core 189 by the screws 188.

During this separation of the movable clamping plate 201 from the movable core 189, springs 208 (one shown), which extend between the movable clamp plate 201 and a cavity retainer plate 209 through passages 210 in the movable core 189, hold the cavity retainer plate 209 against following movement of the movable core 189. The cavity retainer plate 209 surrounds the water ring 191 and is attached to a cavity ring 211 (see FIG. 19), which surrounds the cavity plate 182, by screws 212 (one shown). The cavity retainer plate 209 (see FIG. 20) also is attached by screws 213 (one shown) to a cavity plate 214, which surrounds the cavity ring 211 (see FIG. 19).

Because of the force of the springs 208, the cavity retainer plate 209, the cavity ring 211, and the cavity plate 214 do not initially move when the movable core 189 moves with the movable clamp plate 201 (see FIG. 20). However, the initial movement of the movable core 189 does withdraw the movable core 189 and the movable core plug 187 from the position of FIG. 19 to the position of FIG. 20.

Figure 21:
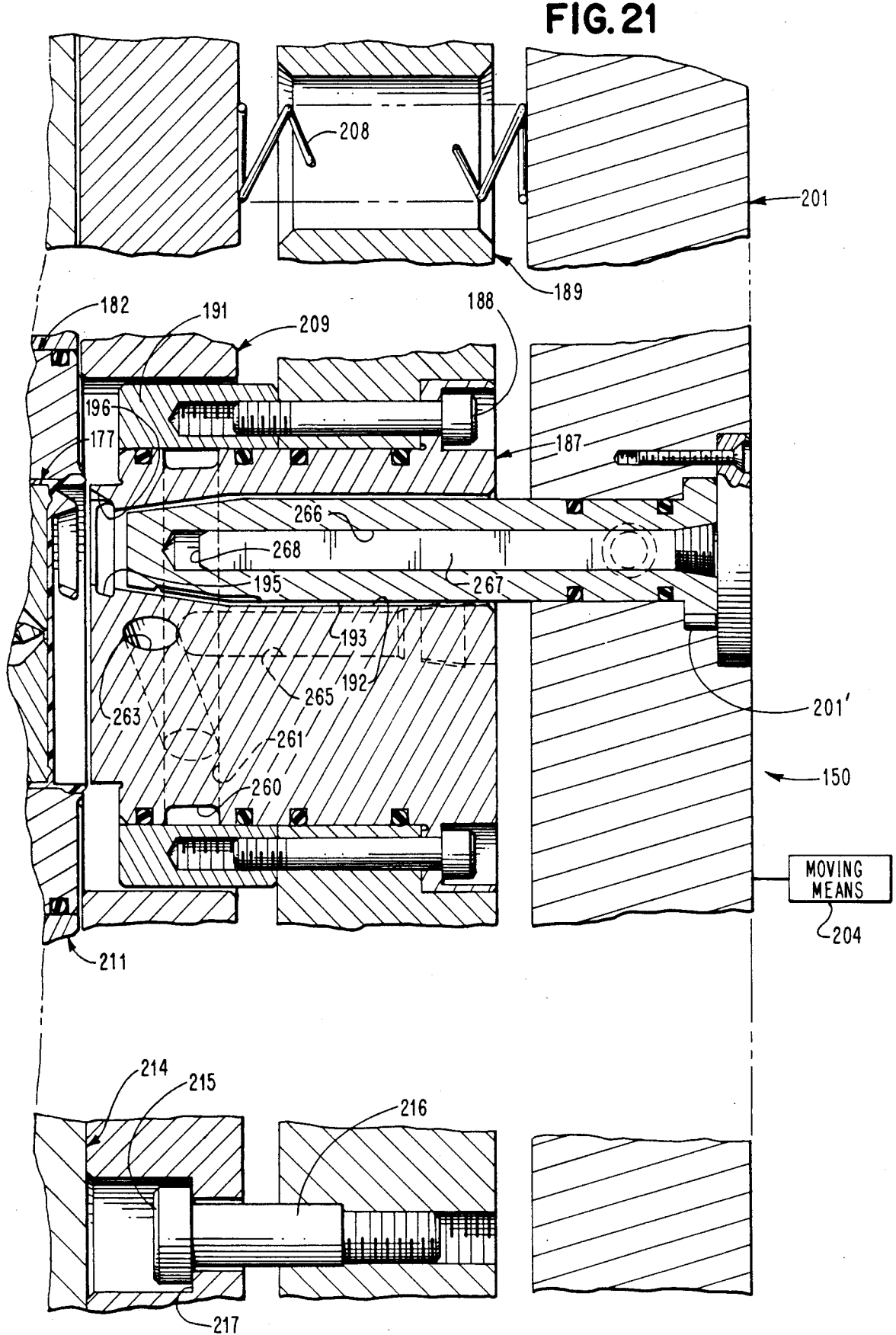
FIG. 21 is a fragmentary sectional view, partly schematic, of the molding apparatus of FIG. 19 with the second parting of portions of the molding apparatus completed.

When the springs 208 (see FIG. 21) are fully extended, there will be a space between the movable core 189 and the cavity retainer plate 209 and between the movable core 189, the movable core plug 187, and the water ring 191 and the cavity plate 182 and the force cap 177 shown in FIG. 21. At this time, each of heads 215 (one shown) of bolts 216 (one shown), which are attached to the movable core 189, engages one of a plurality of annular shoulders 217 (one shown) in the cavity retainer plate 209 to cause the cavity retainer plate 209 to follow the movement of the movable clamp plate 201 and the movable core 189. This also causes the cavity ring 211, the cavity plate 214, and the cavity plate 182 to move therewith. The cavity plate 182 moves therewith because an annular shoulder 218 (see FIG. 19) on the cavity ring 211 engages an annular shoulder 219 on the cavity plate 182.

Figure 22:
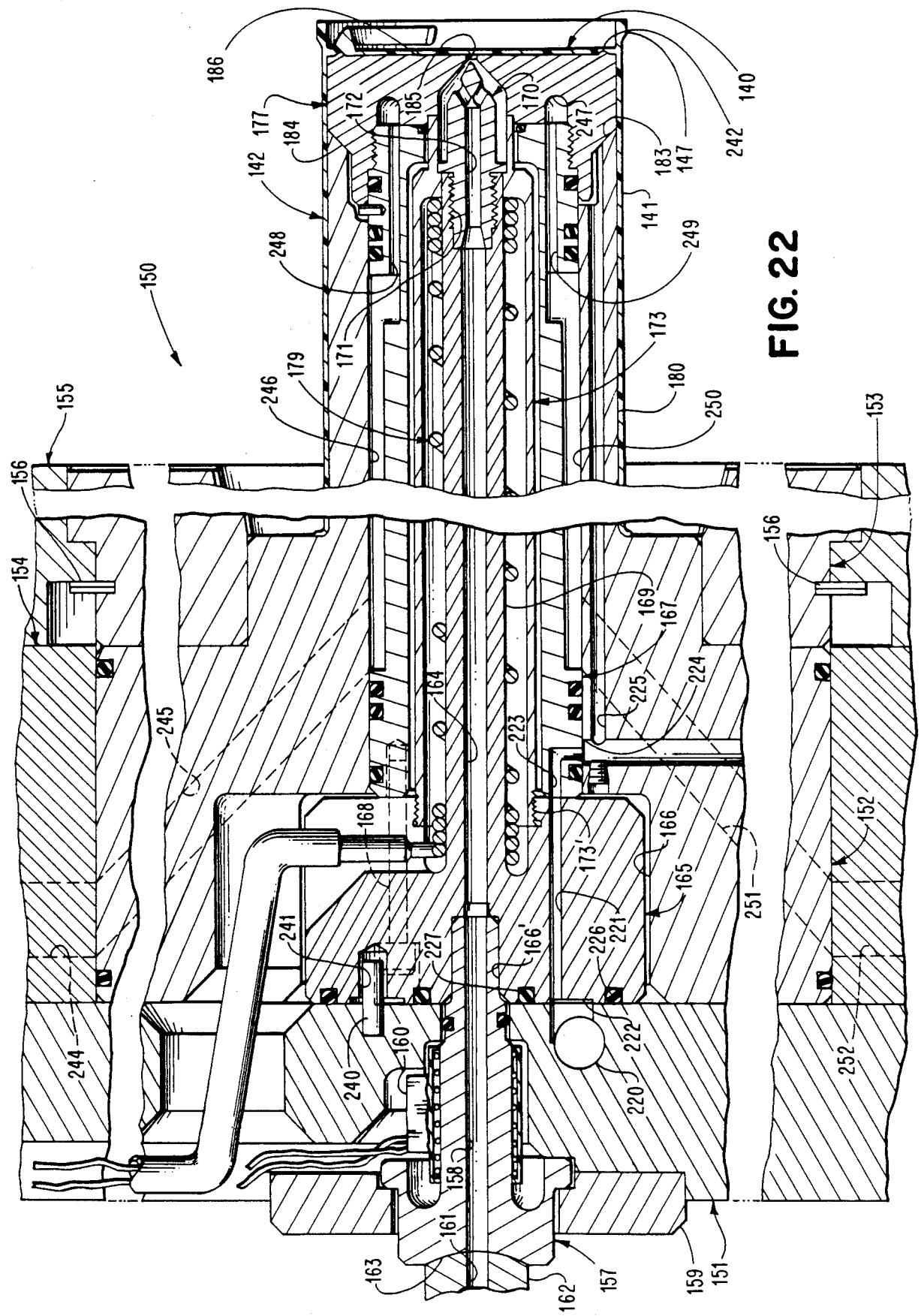
FIG. 22 is a fragmentary sectional view of a portion of the molding apparatus of FIG. 19 in its fully open position with the integral end closure and container wall about to be stripped from the molding apparatus.

This motion of the cavity retainer plate 209, the cavity ring 211, the cavity plate 214, and the cavity plate 182 continues until there is enough clearance for the molded end closure 140 (see FIG. 22) and the integral cylindrical wall 141 of the container 142 to fall freely when ejected from the position on the force cap 177 and the elongated hollow portion 180 of the force base 152. This position is shown in FIG. 22.

At this time, pressurized air is supplied from a pressurized air source (not shown) through an air line 220 in the stationary clamp plate 151 to four equally angularly spaced air passages 221 (one shown) in the sprue base 165 through an annular chamber 222. The annular chamber 222 is formed in the sprue base 165 adjacent the stationary clamp plate 151.

Each of the passages 221 in the sprue base 165 communicates with a separate L-shaped air passage 223 (one shown) in the piston shaft 167. The end of each of the separate L-shaped air passages 223 communicates with a corresponding enlarged air passage 224 (one shown) in the force base 152. Each of the four enlarged air passages 224, which are plugged (not shown) at the outer surface of the force base 152, is larger than the communicating L-shaped passage 223 so that each of the L-shaped air passages 223 remains in communication with the corresponding air passage 224 when there is relative motion (about 0.003" to 0.005") therebetween by movement of the piston shaft 167 with respect to the force base 152.

Each of the four enlarged air passages 224 communicates with a corresponding one of four equally angularly spaced air passages 225 in the elongated hollow portion 180 of the force base 152. Each of the four air passages 225 terminates at the angled surface 183 of the elongated hollow portion 180 of the force base 152 to apply pressurized air to the angled surface 184 of the force cap 177.

The force of this pressurized air from the air passages 225 on the angled surface 184 of the force cap 177 causes relative motion of the force cap 177, the piston shaft 167, the sprue base 165, the sprue heater shield 173, and the nozzle tip 170 with respect to the force base 152. This slight motion of 0.003" to 0.005" allows pressurized air to escape between the angled surface 183 of the fixed force base 152 and the angled surface 184 of the movable force cap 177. As a result, a thin layer of pressurized air flows between the molded cylindrical wall 141 of the container 142 and each of the elongated hollow portion 180 of the force base 152 and the force cap 177 and between the molded end closure 140 and the end surface 186 of the force cap 177. This strips the end closure 140 and the integral cylindrical wall 141 of the container 142 from the molding apparatus 150.

The molding apparatus 150 has O-rings 226 and 227 surrounding the annular chamber 222 and mounted in the sprue base 165. The slight relative motion (0.003" to 0.005") between the sprue base 165 and the stationary clamp plate 151 does not result in the O-rings 226 and 227 ceasing to engage the stationary clamp plate 151 because the O-rings 226 and 227 are so compressed that they will remain sufficiently compressed to maintain a seal with the stationary clamp plate 151 even when the sprue base 165 is moved a slight distance therefrom. Therefore, there is no interruption of the flow of the pressurized air from the air line 220 to the air passages 221 in the sprue base 165 when the sprue base 165 is moved away from the stationary clamp plate 151.

The cavity plate 182 (see FIG. 19) has four equally angularly spaced grooves 228 in its end surface 229. Each of the grooves 228 communicates with a corresponding groove 230 in an angled surface 231 of the core ring 153. The core ring 153 has four equally angularly spaced grooves 232 with each in its end surface 233 communicating with a corresponding one of the four grooves 230 in the angled surface 231 of the core ring 153. The end surface 233 of the core ring 153 engages the cavity ring 211 when the molding apparatus 150 is in the positions of FIGS. 19-21. The grooves 228 (see FIG. 19), 230, and 232 cooperate to allow air to escape from the space between the elongated hollow portion 180 of the force base 152 and the wall of the cavity 181 in the cavity plate 182 when molten plastic flows thereinto.

The angled surface 231 of the core ring 153 is adjacent an angled surface 234 of the cavity plate 182. The angled surfaces 231 and 234 cooperate to insure precise alignment between the two portions of the molding apparatus 150 that are separated from each other to remove the end closure 140 (see FIG. 18) and the integral cylindrical wall 141 of the container 142 and then return when another of the end closures 140 and the integral cylindrical wall 141 of the container 142 are to be formed.

The cavity plate 182 (see FIG. 19) has four equally angularly spaced grooves 235 in its end surface 236, which is adjacent the water ring 191 and the cavity retainer plate 209. The grooves 235 communicate with corresponding grooves 237 in an end surface 238 of the cavity retainer plate 209 and an annular space 239 between the water ring 191 and the cavity retainer plate 209 to allow air to escape from the recess formed between the end surface 186 of the force cap 177 and the end surfaces 190 and 194 of the core plug 187 and the handle post 193, respectively, when molten plastic is injected thereinto.

The stationary clamp plate 151 (see FIG. 22) has a dowel pin 240 extending therefrom and disposed within a recess 241 in the sprue base 165. This insures that the sprue base 165 remains properly aligned and does not shift from being advanced by the pressurized air or when being retracted after the pressurized air is removed by molten plastic being again supplied through the orifice 185 in the force cap 177.

To form the single continuous score line 144 (see FIG. 17) of the end closure 140, the end surface 186 (see FIG. 19) of the force cap 177 has a projection 242 extending therefrom. This produces a relatively thin portion of the main panel 143 (see FIG. 17) of the end closure 140 to create the single continuous score line 144.

Coolant such as water is supplied to various portions of the molding apparatus 150 (see FIG. 22). Coolant is supplied through a coolant conduit 244 in the force plate 154 and a communicating coolant conduit 245 in the force base 152. The coolant conduit 245 communicates with a serpentine coolant channel 246, which is formed for approximately 180° between the piston shaft 167 and the force base 152.

Coolant is supplied from the coolant channel 246 to an annular coolant channel 247 in the force cap 177 through a passage 248 in the piston shaft 167. Coolant flows from the coolant channel 247 through a passage 249 in the piston shaft 167 and diametrically disposed to the passage 248. Coolant flows from the passage 249 through a serpentine coolant channel 250, which is formed for approximately 180° between the piston shaft 167 and the force base 152. The coolant in the coolant channel 250 is returned to its source through a coolant conduit 251 in the force base 152 and a coolant conduit 252 in the force plate 154.

Coolant also is supplied to the cavity plate 182 (see FIG. 19) through a plurality of annular channels 255. Each of the annular coolant channels 255 has a coolant supply conduit 256 in the cavity ring 211 connected thereto and a coolant exhaust conduit 257 in the cavity ring 211 connected thereto.

The movable core plug 187 also has coolant supplied thereto. Coolant is circulated through an annular chamber 260, which is adjacent the water ring 191.

Figure 23:
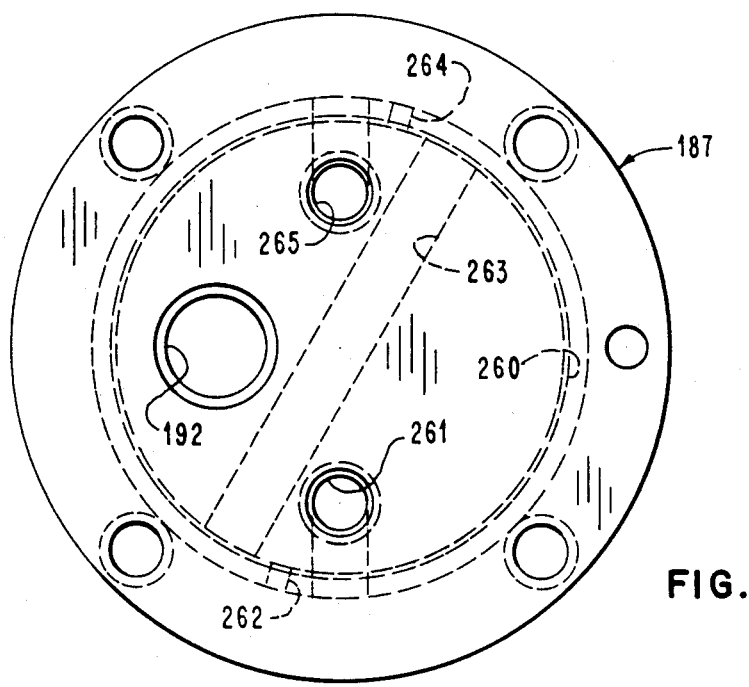
FIG. 23 is an end elevational view of a core plug of the molding apparatus of FIG. 19.

Coolant is supplied to the annular chamber 260 through a coolant conduit 261 (see FIG. 23) in the movable core plug 187. The annular chamber 260 is blocked by a coolant dam 262 adjacent the communication of the conduit 261 with the annular chamber 260. Thus, the coolant flows from the conduit 261 through the annular chamber 260 to one end of a passage 263 in the core plug 187 since there is a coolant dam 264, which is diametrically disposed to the coolant dam 262, in the annular chamber 260 adjacent the communication of the annular chamber 260 with the passage 263.

The passage 263 is slightly V-shaped so that it is lower at the center than at its ends. This insures that there is coolant adjacent the orifice 185 (see FIG. 19) in the force cap 177.

The passage 263 (see FIG. 23) has its other end communicate with the annular chamber 260 on the opposite side of the dam 262 from the communication with the coolant conduit 261. The coolant flows through the annular chamber 262 to a coolant conduit 265 in the movable core plug 187 for return to its source. Each of the coolant conduits 261 and 265 communicates through a coolant conduit (not shown) in the movable core 189 (see FIG. 19) with the coolant source.

Coolant also is circulated in the interior of the handle post 193 (see FIG. 20) through a blind bore 266 in the handle post 193. The bore 266 has a divider baffle 267 therein to enable the flow of coolant water through the bore 266 on one side of the baffle 267 and exhaust on the other side of the baffle 267 after passing beneath its end 268, which is spaced from the end of the bore 266.

Guide pins 270 (one shown in FIG. 20) are employed to provide proper alignment of various parts of the molding apparatus 150. The guide pins 270 are supported by the movable clamp plate 201.

While the single continuous score line 144 (see FIG. 17) has been shown and described as being spaced from the cylindrical wall 141 (see FIG. 18), it should be understood that the single continuous score line 144 (see FIG. 17) could be adjacent the junction of the main panel 143 and the cylindrical wall 141 (see FIG. 18) if desired. The single continuous score line 144 (see FIG. 17) would still be in the main panel 143, and the opening into the container 142 (see FIG. 18) would be a maximum.

It should be understood that any of the other end closures having score means could be utilized with the container 142 if desired. It would only be necessary to appropriately form cooperating parts of the molding apparatus 150 to have the score means in the desired locations.

It should be understood that the molding apparatus 50 (see FIG. 7) is shown so that movement is in the vertical direction, but the desired direction is horizontal to enable the formed end closure to fall by gravity after being stripped from the molding apparatus 50.

An advantage of this invention is that it is easy to remove an end closure having a pull ring spaced from its main panel from its molding apparatus without any damage thereto. Another advantage of this invention is that any end closure may be rapidly molded at a relatively low cost. A further advantage of this invention is that an integral container and end closure may be rapidly molded at a relatively low cost.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

We claim:

1. A method of molding a one-piece end closure for closing an open end of a container in which the end closure includes a main panel having at its periphery an annular surrounding portion, a pull ring disposed in spaced and substantially parallel relation to the main panel, and means connecting the pull ring to the main panel including:

injecting a molten plastic into a mold shaped to form the end closure and including first mold means having molding surface means, second mold means having first and second molding surface means, and third mold means having first and second molding surface means, the second mold means having passage means to receive a portion of the third mold means, the passage means in the second mold means having the second molding surface means of the second mold means and the portion of the third mold means having the second molding surface means of the third mold means cooperating with the second molding surface means of the second mold means to form the pull ring when the portion of the third mold means is disposed within the passage means in the second mold means so that the first molding surface means of the third mold means is in the same plane as at least the portion of the first molding surface means of the second mold means surrounding the first molding surface means of the third mold means;

disposing the portion of the third mold means within the passage means in the second mold means so that the first molding surface means of the third mold means is in the same plane as at least the portion of the first molding surface means of the second mold means surrounding the first molding surface means of the third mold means prior to injecting the molten plastic to form the end closure;

injecting the molten plastic between the molding surface means of the first mold means and the first molding surface means of each of the second mold means and the third mold means to form the main panel and the annular surrounding portion of the first end closure;

supplying the molten plastic from between the molding surface means of the first mold means and the first molding surface means of each of the second mold means and the third mold means to between the second molding surface means of each of the second mold means and the third mold means through communicating means in the second mold means with the connecting means being formed by the molten plastic in the communicating means;

producing relative movement between the third mold means and the second mold means to withdraw a portion of the third mold means from the passage means in the second mold means prior to producing relative movement between the first mold means and the second and third mold means without shearing of any molded material so that the pull ring is free to collapse prior to the relative movement between the first mold means and the second and third mold means to enable the pull ring to pass through the passage means in the second mold means when the formed end closure is disengaged from the first molding surface means of the second mold means;

producing relative movement between the first mold means and the second and third mold means substantially parallel to the direction of relative movement between the third mold means and the second mold means to disengage the formed end closure from one of the molding surface means of the first mold means and the first molding surface means of the second mold means without any shearing of the molded material;

and disengaging the formed end closure from the other of the molding surface means of the first mold means and the first molding surface means of the second mold means.

2. The method according to claim 1 in which:

the one of the molding surface means of the first mold means and the first molding surface means of the second mold means is the molding surface means of the first mold means and the other of the molding surface means of the first mold means and the first molding surface means of the second mold means is the first molding surface means of the second mold means;

and disengaging the formed end closure from the first molding surface means of the second mold means by moving fourth mold means relative to the second mold means substantially parallel to the direction of relative movement between the third mold means and the second mold means to disengage the formed end closure from the second mold means.

3. The method according to claim 2 including:
producing the relative movement between the third mold means and the second mold means by moving the third mold means relative to the second mold means;
and producing the relative movement between the first mold means and the second and third mold means by moving the second and third mold means relative to the first mold means.

4. The method according to claim 2 including forming score line means in the main panel of the one-piece end closure by forming the main panel thinner where the score line means is to be formed through forming one of the molding surface means of the first mold means and the first molding surface means of the second mold means with projecting means having the configuration of the score line means.

5. The method according to claim 2 including forming score means in the main panel of the one-piece end closure by forming the main panel thinner where the score line means is to be formed through forming the molding surface means of the first mold means with projecting means having the configuration of the score line means.

6. The method according to claim 1 in which:
the one of the molding surface means of the first mold means and the first molding surface means of the second mold means is the molding surface means of the first mold means and the other of the molding surface means of the first mold means and the first molding surface means of the second mold means is the first molding surface means of the second mold means;
and disengaging the formed end closure from the first molding surface means of the second mold means by applying pressurized air to the formed end closure to disengage the formed end closure from the second mold means.

7. The method according to claim 6 including forming score line means in the main panel of the one-piece end closure by forming the main panel thinner where the score line means is to be formed through forming one of the molding surface means of the first mold means and the first molding surface means of the second mold means with projecting means having the configuration of the score line means.

8. The method according to claim 6 including forming score line means in the main panel of the one-piece end closure by forming the main panel thinner where the score line means is to be formed through forming the molding surface means of the first mold means with projecting means having the configuration of the score line means.

9. The method according to claim 1 including forming a wall of a container integral with the end closure by disposing wall mold means having molding surface means in surrounding relation to portions of the first mold means and the second mold means to have the wall mold means constitute a portion of the mold into which the molten plastic is injected.

10. The method according to claim 9 including:
producing the relative movement between the third mold means and the second mold means by moving the third mold means relative to the second mold means;
and producing the relative movement between the first mold means and the second and third mold means by moving the second and third mold means relative to the first mold means.

11. The method according to claim 9 including forming score line means in the main panel of the one-piece end closure by forming the main panel thinner where the score line means is to be formed through forming one of the molding surface means of the first mold means and the first molding surface means of the second mold means with projecting means having the configuration of the score line means.

12. The method according to claim 9 including forming score line means in the main panel of the one-piece end closure by forming the main panel thinner where the score line means is to be formed through forming the molding surface means of the first mold means with projecting means having the configuration of the score line means.

13. The method according to claim 1 including:
producing the relative movement between the third mold means and the second mold means by moving the third mold means relative to the second mold means;
and producing the relative movement between the first mold means and the second and third mold means by moving the second and third mold means relative to the first mold means.

14. The method according to claim 1 including forming score line means in the main panel of the one-piece end closure by forming the main panel thinner where the score line means is to be formed through forming one of the molding surface means of the first mold means and the first molding surface means of the second mold means with projecting means having the configuration of the score line means.

15. The method according to claim 1 including forming score line means in the main panel of the one-piece end closure by forming the main panel thiner where the score line means is to be formed through forming the molding surface means of the first mold means with projecting means having the configuration of the score line means.

* * * * *

UNITED STATES PATENT AND TRADEMARK OFFICE
CERTIFICATE OF CORRECTION

PATENT NO. : 4,983,346

DATED : January 8, 1991

INVENTOR(S) : Danny R. Curliss et al

It is certified that error appears in the above-identified patent and that said Letters Patent is hereby corrected as shown below:

Title page: item (54) "MOLDEDEND" should read--MOLDED END--.

Column 3, line 43, "A" should read -- An --.

Column 8, line 59, cancel "second".

Column 17, line 36, cancel "with each".

Column 17, line 37, after "233" insert -- with each --.

Column 20, line 22, "first" should be -- formed --.

Column 21, line 26, after "score" insert -- line --.

Column 22, line 53, "thiner" should be -- thinner --.

Signed and Sealed this

Fifteenth Day of September, 1992

Attest:

DOUGLAS B. COMER

Attesting Officer   Acting Commissioner of Patents and Trademarks

UNITED STATES PATENT AND TRADEMARK OFFICE
CERTIFICATE OF CORRECTION

PATENT NO. : 4,983,346

DATED : January 8, 1991

INVENTOR(S) : Danny R. Curliss et al

It is certified that error appears in the above-identified patent and that said Letters Patent is hereby corrected as shown below:

Column 13, line 60, "nozzle 170" should be -- nozzle tip 170 --.

Signed and Sealed this

Seventeenth Day of August, 1993

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 4,983,346
DATED : January 8, 1991
INVENTOR(S) : Danny R. Curliss and Dwight E. Looney It is certified that error appears in the above-indentified patent and that said Letters Patent is hereby corrected as shown below: FIGURES 17 and 18 are amended to appear as follows:

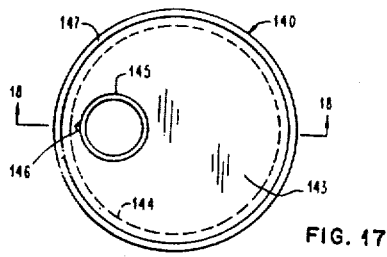

FIG. 17

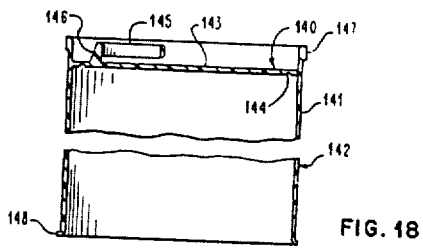

FIG. 18

Signed and Sealed this

First Day of March, 1994

Attest:

BRUCE LEHMAN

Attesting Officer

Commissioner of Patents and Trademarks